(12) United States Patent
Tsudaka

(10) Patent No.: US 8,401,813 B2
(45) Date of Patent: Mar. 19, 2013

(54) TEST TABLE CREATION SYSTEM AND TEST TABLE CREATION METHOD

(75) Inventor: Shinichiro Tsudaka, Chiyoda-ku (JP)

(73) Assignee: Mitsubishi Electric Company, Tokyo (JP)

( * ) Notice: Subject to any disclaimer, the term of this patent is extended or adjusted under 35 U.S.C. 154(b) by 459 days.

(21) Appl. No.: 12/796,742

(22) Filed: Jun. 9, 2010

(65) Prior Publication Data

US 2011/0153258 A1    Jun. 23, 2011

(30) Foreign Application Priority Data

Dec. 18, 2009  (JP) .................................. 2009-287605

(51) Int. Cl.
*G01D 3/00* (2006.01)
(52) U.S. Cl. ......................................................... 702/123
(58) Field of Classification Search .................... 702/123
See application file for complete search history.

(56) References Cited

U.S. PATENT DOCUMENTS 5,978,827 A * 11/1999 Ichikawa ...................... 708/709

FOREIGN PATENT DOCUMENTS

| CN | 101587445 A | 11/2009 |
| JP | 03-034055 | 2/1991 |
| JP | 11-219208 | 8/1999 |
| JP | 2001-273169 | 10/2001 |
| JP | 2007-317096 | 12/2007 |
| JP | 2008-210004 | 9/2008 |
| JP | 2008-269082 | 11/2008 |

OTHER PUBLICATIONS

Japanese Office Action issued Apr. 24, 2012, in Patent Application No. 2009-287605.
Document of First Office Action from JPO issued Oct. 18, 2011, in patent application No. 2009-287605.
Office Action issued Oct. 25, 2012 in Chinese Application No. 201010243739.7 (w/English translation).

* cited by examiner

*Primary Examiner* — Aditya Bhat
(74) *Attorney, Agent, or Firm* — Oblon, Spivak, McClelland, Maier & Neustadt, L.L.P.

(57) ABSTRACT

The objective of the present invention is to efficiently create a test table in a monitoring control system.
There are provided a logic drawing analysis unit (20) that analyzes a logic drawing (LG1) stored in a logic drawing storage device (1); an input value creation unit (8) that creates an input value for each of the input value types into which analogue values are categorized, based on an input point (11) of the logic drawing (LG1) derived by the logic drawing analysis unit (20) and an input specification (ITB1) for the logic drawing (LG1) stored in an input specification storage device (2); an output value creation unit (6) that creates the respective expected values corresponding to the input values created in the input value creation unit (8), for the output points (15, 18) that correspond to the types of arithmetic elements derived by the logic drawing analysis unit (20); and a table creation unit (9) that creates a test table (TTB1), based on the input value created by the input value creation unit (8) and the expected value created by the output value creation unit (6).

10 Claims, 19 Drawing Sheets

FIG. 5

| NAME | SYMBOL | PARAMETER | EXPLANATION |
|---|---|---|---|
| LOGICAL MULTIPLICATION | 101 | NONE | OUTPUTS "1" ONLY WHEN ALL INPUTS ARE "1", AND OUTPUTS "0" IN OTHER CASES |
| LOGICAL SUM | 102 | NONE | OUTPUTS "0" ONLY WHEN ALL INPUTS ARE "0", AND OUTPUTS "1" IN OTHER CASES |
| LOGICAL NEGATION | 103 | NONE | OUTPUTS "1" WHEN INPUT IS "0" OUTPUTS "0" WHEN INPUT IS "1" |
| RS FLIP-FLOP | 104 | NONE | IF (R, S) = (0, 0), HOLDS OUTPUT<br>IF (R, S) = (0, 1), OUTPUTS "1"<br>IF (R, S) = (1, 0), OUTPUTS "0"<br>IF (R, S) = (1, 1), INDETERMINATE OUTPUT |
| INPUT POINT | 105a, 105b | INPUT POINT NAME | INPUT THROUGH WHICH SIGNAL IS INPUTTED FROM ANOTHER MODULE TO THIS MODULE |
| OUTPUT POINT | 106a, 106b | OUTPUT POINT NAME | OUTPUT THROUGH WHICH SIGNAL IS OUTPUTTED THIS MODULE TO ANOTHER MODULE |
| UPPER LIMIT MONITOR | 107 | UPPER LIMIT VALUE | OUTPUTS "1" WHEN INPUT EXCEEDS UPPER LIMIT VALUE, AND OUTPUTS "0" IN OTHER CASES |
| LOWER LIMIT MONITOR | 108 | LOWER LIMIT VALUE | OUTPUTS "1" WHEN INPUT IS UNDER LOWER LIMIT VALUE, AND OUTPUTS "0" IN OTHER CASES |
| ANALOGUE SELECTOR | 109 | NONE | OUTPUT= INPUT 1 WHEN SEL IS "1", OUTPUT= INPUT 0 WHEN SEL IS "0" |

FIG. 8

| INPUT POINT NAME | LOWER LIMIT | UPPER LIMIT |
|---|---|---|
| THERMOMETER A | 0 | 100 |

~ ITB1

FIG. 9

| OUTPUT POINT NAME | TYPE |
|---|---|
| A ABNORMALLY LOW TEMPERATURE ALARM SIGNAL | LOWER LIMIT |
| A ABNORMALLY HIGH TEMPERATURE ALARM SIGNAL | UPPER LIMIT |

~ OTB1

FIG. 10

| INPUT VALUE | TYPE |
|---|---|
| -1 | SMALLER-THAN-LOWER-LIMIT VALUE |
| 0 | LOWER LIMIT VALUE |
| 50 | MIDDLE VALUE |
| 100 | UPPER LIMIT VALUE |
| 101 | LARGER-THAN-UPPER-LIMIT VALUE |

~ OTB2

FIG. 11

| | | TYPE OF OUTPUT POINT | |
| --- | --- | --- | --- |
| | | LOWER LIMIT | UPPER LIMIT |
| TYPE OF INPUT VALUE | SMALLER-THAN-LOWER-LIMIT VALUE | 1 | 0 |
| | LOWER LIMIT VALUE | 0 | 0 |
| | MIDDLE VALUE | 0 | 0 |
| | UPPER LIMIT VALUE | 0 | 0 |
| | LARGER-THAN-UPPER-LIMIT VALUE | 0 | 1 |

OTB3

FIG. 12

| | INPUT POINT | OUTPUT POINT | |
| --- | --- | --- | --- |
| POINT NAME | THERMOMETER A | A ABNORMALLY LOW TEMPERATURE ALARM SIGNAL | A ABNORMALLY HIGH TEMPERATURE ALARM SIGNAL |
| VALUE | −1 | 1 | 0 |
| | 0 | 0 | 0 |
| | 50 | 0 | 0 |
| | 100 | 0 | 0 |
| | 101 | 0 | 1 |

TTB1

FIG. 17

| OUTPUT POINT NAME | TYPE | INPUT CONDITION | | |
|---|---|---|---|---|
| | | SELECTION SIGNAL | SETTING 1 | SETTING 2 |
| A ABNORMALLY LOW TEMPERATURE ALARM SIGNAL | LOWER LIMIT | NO CONDITION | 0 | 1 |
| A ABNORMALLY HIGH TEMPERATURE ALARM SIGNAL | UPPER LIMIT | 1 | 1 | 0 |
| B ABNORMALLY HIGH TEMPERATURE ALARM SIGNAL | UPPER LIMIT | 0 | 1 | 0 |

OTB4

FIG. 18

| INPUT POINT | VALUE |
|---|---|
| SETTING 1 | 0 |
| SETTING 2 | 1 |

OTB5

FIG. 19

TTB2

| | INPUT POINT | | | | OUTPUT POINT | |
|---|---|---|---|---|---|---|
| POINT NAME | THERMOMETER A | SELECTION SIGNAL | SETTING 1 | SETTING 2 | A ABNORMALLY LOW TEMPERATURE ALARM SIGNAL | A(B) ABNORMALLY HIGH TEMPERATURE ALARM SIGNAL |
| VALUE | −1 | NO CONDITION | 0 | 1 | 1 | |
| | 0 | NO CONDITION | 0 | 1 | 0 | |
| | 50 | NO CONDITION | 0 | 1 | 0 | |
| | 100 | NO CONDITION | 0 | 1 | 0 | |
| | 101 | NO CONDITION | 0 | 1 | 0 | |
| | −1 | 1 | 1 | 0 | | 0 |
| | 0 | 1 | 1 | 0 | | 0 |
| | 50 | 1 | 1 | 0 | | 0 |
| | 100 | 1 | 1 | 0 | | 0 |
| | 101 | 1 | 1 | 0 | | 1 |

FIG. 22

| POINT NAME | \multicolumn{6}{c}{INPUT POINT} | \multicolumn{2}{c}{OUTPUT POINT} |
|---|---|---|---|---|---|---|---|---|
| | THERMOMETER A | SELECTION SIGNAL | SETTING 1 | SETTING 2 | SETTING 3 | SETTING 4 | A ABNORMALLY LOW TEMPERATURE ALARM SIGNAL | A(B) ABNORMALLY HIGH TEMPERATURE ALARM SIGNAL |
| VALUE | −1 | NO CONDITION | 0 | 0 | 0 | 1 | 1 | |
| | 0 | NO CONDITION | 0 | 0 | 0 | 1 | 0 | |
| | 50 | NO CONDITION | 0 | 0 | 0 | 1 | 0 | |
| | 100 | NO CONDITION | 0 | 0 | 0 | 1 | 0 | |
| | 101 | NO CONDITION | 0 | 0 | 0 | 1 | 0 | |
| | −1 | 1 | 0 | 0 | 0 | 0 | | 0 |
| | 0 | 1 | 0 | 0 | 0 | 0 | | 0 |
| | 50 | 1 | 0 | 0 | 0 | 0 | | 0 |
| | 100 | 1 | 0 | 0 | 0 | 0 | | 0 |
| | 101 | 1 | 0 | 0 | 0 | 0 | | 1 |

TTB3

TEST TABLE CREATION SYSTEM AND TEST TABLE CREATION METHOD

BACKGROUND OF THE INVENTION

1. Field of the Invention

The present invention relates to automatic creation of a test table in a monitoring control system.

2. Description of the Related Art

A monitoring control system is a system for providing an operating/monitoring person with a temperature, a pressure, a position and other information items from devices to be monitored such as various kinds of sensors and for controlling various kinds of devices such as a motor, a valve, a switch, and a hydraulic device through the operation of the operating/monitoring person; it is utilized in many fields such as a power generation plant, a chemical plant, an electricity reception/distribution system, and a water supply and sewerage system.

A typical monitoring control system has a configuration as illustrated in FIG. 2. The monitoring control system is configured with a module that performs signal transmission and reception with a device to be monitored, a module that performs information exchange with an operating/monitoring person, a module that performs calculation based on those information items, and the like; these modules are connected with one another through communication paths.

In general, the processing contents of each module in the monitoring control system are expressed by directed graphs as is the case with a circuit diagram. Signal processing is expressed by a node, and the flow of a signal is expressed by a link that connects nodes. Hereinafter, a node where signal processing is performed is referred to as an arithmetic element, and a link that connects arithmetic elements is referred to as a signal line. The processing contents of a module were achieved by a hardware circuit in the past; however, in recent years, in view of flexibility and cost performance, processing is mostly achieved by simulating the operation by use of a digital computer, i.e., processing is implemented as a program of the digital computer.

Standards of programming languages for expressing processing contents by arithmetic elements and signal lines are typified by the international standard IEC61131-3. Arithmetic elements are described by a FBD (Function Block Diagram) of the international standard; for example, it is expressed as illustrated in FIG. 4. Processing contents expressed by arithmetic elements and signal lines are represented, for example, as in FIG. 3. In the present invention, a drawing configured with signal lines and arithmetic elements for processing the signal lines is referred to as a logic drawing, hereinafter.

In recent years, as the scale of a program has become larger, it has been becoming difficult to appropriately extract test items of a program. To date, as far as logic drawings are concerned, there has been no method of efficiently extracting test items; therefore, it has relied on designers' experiences and the like. In addition, in order to actually perform a test, it has been required that not only test items but also specifically inputted values, the desirable values (expected values) outputted in response to the input, and the like are written so that a test table is created.

Patent Document 1 discloses an example where test items of a program are extracted. A program test specification creation system disclosed in Patent Document 1 is a system for analyzing a program and extracting test items in accordance with the importance so as to create a program test specification. There are provided a program analysis unit that extracts variables and functions from a program, a display unit that displays the extracted variables and functions, an input unit for inputting information that specifies a variable and a function, a test item extraction unit that extracts a description including the variable and the function specified by the inputted information, and a specification creation unit that creates a program test with the extracted description utilized as a test item. In addition, there is provided a mechanism in which variables and functions are selected based on an occurrence rate or the number of steps (nest level) of a control structure and then a specification is created for the variables and the functions through the same procedure.

PRIOR ART REFERENCE

Patent Document

[Patent Document 1] Japanese Patent Application Laid-Open No. 2001-273169 (FIGS. 1 and 2)

In a typical test on a monitoring control system, it is tested whether or not an appropriate digital signal is outputted for an analogue value to be monitored. For example, assuming that an analogue value from a temperature sensor is to be monitored, several values are inputted to a module that monitors the analogue value, and it is tested whether or not a digital signal indicating abnormally high temperature, abnormally low temperature, or the like is outputted in a communication path. In the present invention, this test is referred to as a static test.

Because the static test in a monitoring control system is performed for each analogue value to be monitored, the number thereof is large; thus, the scale of the test table is likely to become large. To date, it has been an issue that creation of the test table is efficiently carried out.

The program test specification creation system disclosed in Patent Document 1 is capable of extracting test items from a program described in an advanced computer language such as the C language. Based on a dialogue with a user, the occurrence rate, or the nest level, test items are extracted from variables and functions and then a test specification is created based on the test items. In a logic drawing, a variable and a function in a program correspond to a signal line and an arithmetic element, respectively. It may be possible that, utilizing the foregoing matters, the program test specification creation system disclosed in Patent Document 1 is applied to a logic drawing so that test items are extracted; however, there has been a problem that, because it is a very difficult work to appropriately extract test items from many variables and functions through a dialogue operation, the extraction cannot efficiently be performed.

The occurrence rate and the nest level may serve as hints about the importance of a variable and a function, and by intensively determining some test items by use of these measures, it can be expected that a defect can efficiently be suppressed from occurring by limited test items; however, because these measures depend on implementation and do not denote any demand for the system, they are not suitable as the test items for verifying whether or not a demand is satisfied. Furthermore, in order to actually perform a test, it is required to create a test table for each test item; however, in Patent Document 1, nothing is described about that.

SUMMARY OF THE INVENTION

The objective of the present invention is to efficiently create a test table in a monitoring control system.

There are provided a logic drawing analysis unit that analyzes the logic drawing stored in a logic drawing storage device; an input value creation unit that creates the input value for each of input value types into which the analogue values are categorized, based on an input point of the logic drawing derived by the logic drawing analysis unit and the input specification for the logic drawing stored in an input specification storage device; an output value creation unit that creates the respective expected values corresponding to the input values created in the input value creation unit, for the output points that correspond to the types of arithmetic elements derived by the logic drawing analysis unit; and a table creation unit that creates a test table, based on the input value created by the input value creation unit and the expected value created by the output value creation unit.

In a test table creation system according to the present invention, based on the input specification for a logic drawing and the result of analysis performed by the logic drawing analysis unit, there is created a test table that includes input values, which are analogue values, and the expected values of processing outputs; therefore, a test table can efficiently be created.

The foregoing and other object, features, aspects, and advantages of the present invention will become more apparent from the following detailed description of the present invention when taken in conjunction with the accompanying drawings.

BRIEF DESCRIPTION OF THE DRAWINGS

FIG. 5 is a table for explaining typical arithmetic elements;

FIG. 8 is an example of input specification stored in an input specification storage device 2 in FIG. 1;

FIG. 9 is an example of output-point information stored in an output point storage unit 7 in FIG. 1;

FIG. 10 is an example of input-value information created by an input value creation unit 8 in FIG. 1;

FIG. 11 is an example of output-value information created by an output value creation unit 6 in FIG. 1;

FIG. 12 is an example of test table created by a table creation unit 9 in FIG. 1;

FIG. 17 is an example of output-point information stored in an output point storage unit 7 according to Embodiment 2;

FIG. 18 is an example of input-condition information acquired in the step S323 in FIG. 14;

FIG. 19 is an example of test table created by a table creation unit 9 according to Embodiment 2;

FIG. 22 is an example of test table created by a table creation unit 9 according to Embodiment 3.

DETAILED DESCRIPTION OF THE PREFERRED EMBODIMENTS

Embodiment 1

Figure 1:
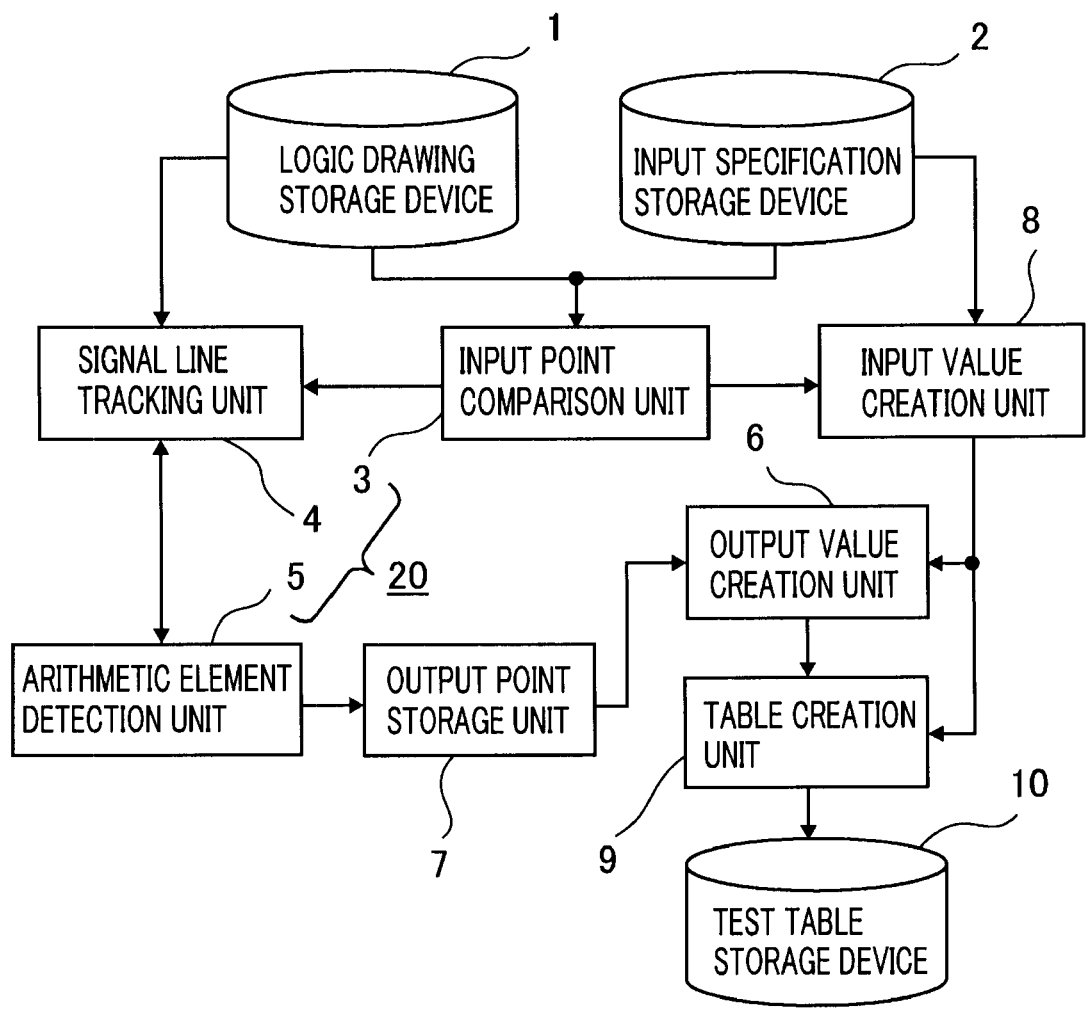
FIG. 1 is a diagram illustrating the configuration of a test table creation system according to Embodiment 1 of the present invention.

FIG. 1 is a diagram illustrating the configuration of a test table creation system according to Embodiment 1 of the present invention. The test table creation system in FIG. 1 includes a logic drawing storage device 1, an input specification storage device 2, an input point comparison unit 3, a signal line tracking unit 4, an arithmetic element detection unit 5, an output value creation unit 6, an output point storage unit 7, an input value creation unit 8, a table creation unit 9, and a test table storage device 10. The input point comparison unit 3 acquires a logic drawing from the logic drawing storage device 1 and an input specification from the input specification storage device 2, performs comparison between input points described in the logic drawing and the input specification, and then finds the input point described in the drawing.

The signal line tracking unit 4 and the arithmetic element detection unit 5 give output-point information to the output point storage unit 7, based on the logic drawing and information from the input point comparison unit 3. The input point comparison unit 3, the signal line tracking unit 4, and the arithmetic element detection unit 5 configure a logic drawing analysis unit 20. The logic drawing analysis unit 20 analyzes a logic drawing. On the other hand, the input value creation unit 8 acquires the lower limit and the upper limit of a comparison point from the input point comparison unit 3 and the input specification storage device 2, and then creates an input value to be utilized in a test. The output value creation unit 6 calculates the correct output value for each input value. In response to the results in the output value creation unit 6 and the input value creation unit 8, the table creation unit 9 creates a test table. The test table storage device 10 stores the test table created by the table creation unit 9.

Figure 2:
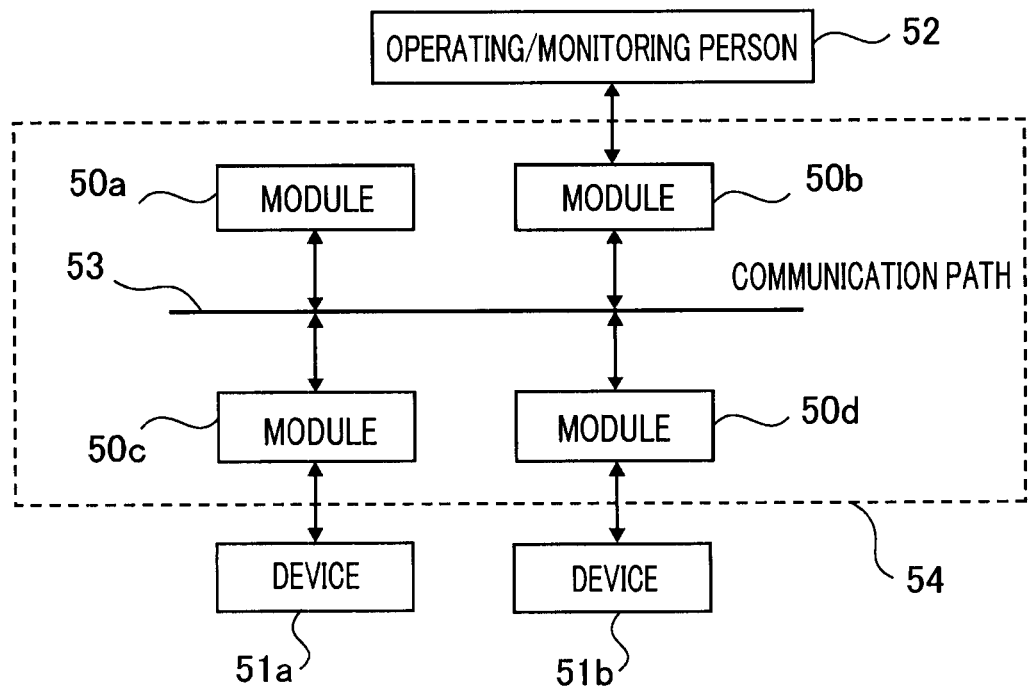
FIG. 2 is a diagram illustrating the configuration of a typical monitoring control system.

FIG. 2 is a diagram illustrating the configuration of a typical monitoring control system. The monitoring control system 54 has four modules 50a, 50b, 50c, and 50d that are connected with one another through a communication path 53. The modules 50a and 50b perform signal transmission and reception with devices 51a and 51b to be monitored. The module 50b exchanges information with an operating/monitoring person 52. The module 50a performs calculation and the like, based on information from the modules 50b, 50c, and 50d.

Figure 3:
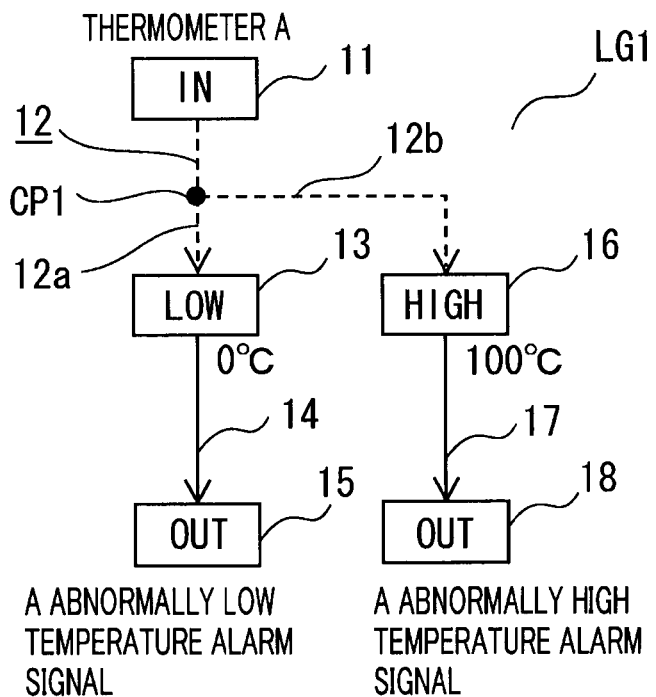
FIG. 3 is a diagram illustrating an example where the contents of the processing in a module of FIG. 2 are expressed by a logic drawing.
Figure 4:
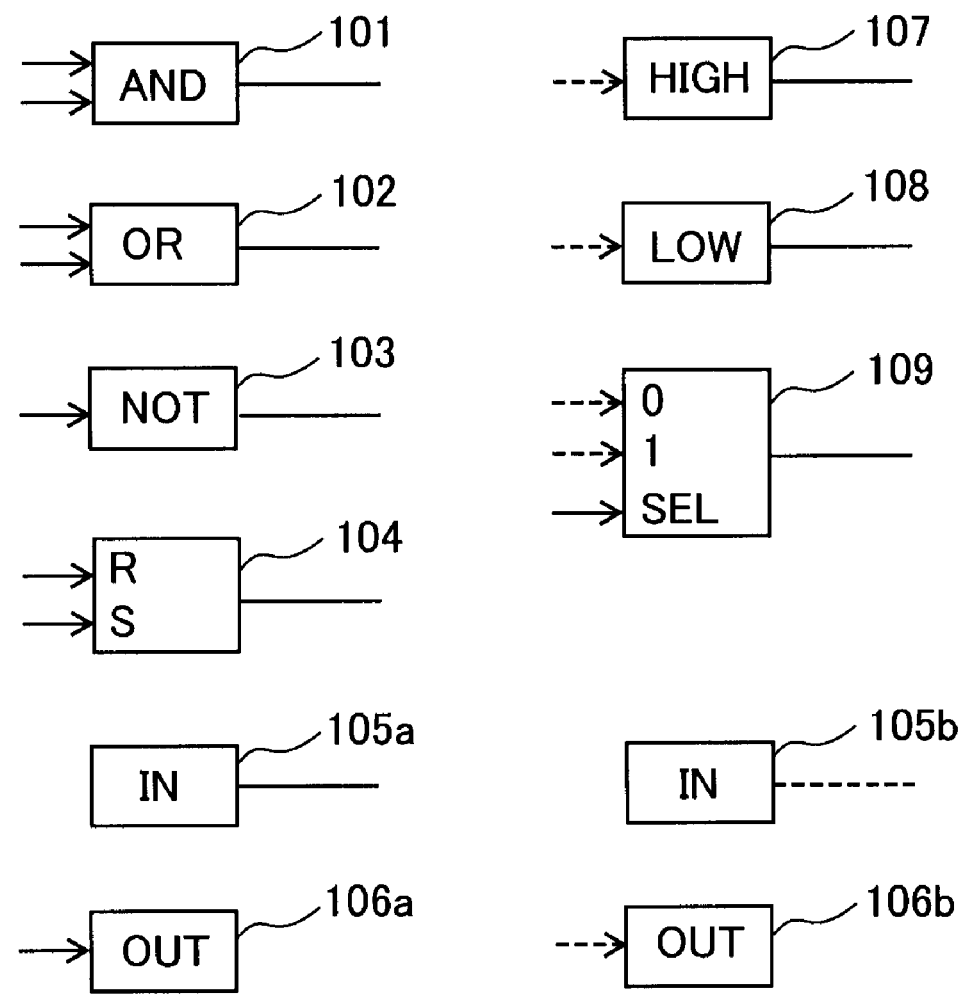
FIG. 4 is a diagram illustrating typical arithmetic elements.

FIG. 3 is a diagram illustrating an example where the contents of the processing in the module 50a of FIG. 2 are expressed by a logic drawing; FIG. 4 is a diagram illustrating typical arithmetic elements. The processing illustrated in FIG. 3 is to generate an alarm signal in the case where the temperature of a predetermined point of the device 51a is abnormal. A logic drawing LG1 in FIG. 3 is an example where five arithmetic elements illustrated in FIG. 4 are utilized. An arithmetic element 11 is an input point and represents input from the module 50c to the module 50a. An arithmetic element 13 is a lower limit monitor; it outputs "1" in the case where the input thereof is smaller than the lower limit and outputs "0" in other cases. An arithmetic element 16 is an upper limit monitor; it outputs "1" in the case where the input thereof is larger than the upper limit and outputs "0" in other cases. Arithmetic elements 15 and 18 are output points and represent outputs to other modules. The lower limit monitor 13 has a lower limit value of 0° C., as a parameter; the upper limit monitor 16 has an upper limit value of 100° C., as a parameter.

Through a signal line 12, a signal is transmitted from the input point 11 to the lower limit monitor 13 and the upper limit monitor 16. In the signal line 12, there exists a branch point CP1; a signal line 12a is provided between the input point 11 and the lower limit monitor 13; a signal line 12b is provided between the input point 11 and the upper limit monitor 16. Through a signal line 14, a signal is transmitted from the lower limit monitor 13 to the output point 15; through a signal line 17, a signal is transmitted from the upper limit monitor 16 to the output point 18. The broken line means that the signal is a continuous value (analogue value); the solid line means that the signal is a discrete value (digital value). Here, a continuous value is expressed by a floating-point.

FIG. 5 is a table for explaining typical arithmetic elements in FIG. 4. In typical arithmetic elements, as represented in FIG. 4, there are included a logical multiplication 101, a logical sum 102, a logical negation 103, an RS flip-flop 104, an input point 105 (105a, 105b), an output point (106a, 106b), an upper limit monitor 107, a lower limit monitor 108, and an analogue selector 109. The logical multiplication 101 outputs "1" only in the case where all inputs thereof are "1", and outputs "0" in other cases. The logical sum 102 outputs "0" only in the case where all inputs thereof are "0", and outputs "1" in other cases. The logical negation 103 outputs "1" in the case where the input thereof is "0", and outputs "0" in the case where the input thereof is "1". The RS flip-flop 104 outputs in accordance with the statuses of the inputs R and S. In the case where (R, S)=(0, 0), the RS flip-flop 104 holds the immediately previous output. In the case where (R, S)=(0, 1), the RS flip-flop 104 outputs "1". In the case where (R, S)=(1, 0), the RS flip-flop 104 outputs "0". In the case where (R, S)=(1, 1), the output of the RS flip-flop 104 is indeterminate.

The input point 105 is an input from another module; the output point 106 is an output to another module. The upper limit monitor 107 outputs "1" in the case where the input thereof is larger than the upper limit value, and outputs "0" in other cases. The lower limit monitor 108 outputs "1" in the case where the input thereof is smaller than the lower limit value, and outputs "0" in other cases. The analogue selector 109 outputs the input through Input 1 in the case where Input SEL is "1", and outputs the input through Input 0 in the case where Input SEL is "0". Some of the arithmetic elements have parameters represented in FIG. 5. In FIG. 3, parameters are expressed in a logic drawing.

Some of the arithmetic elements are characteristic ones utilized in the present invention. The input value and output value of a characteristic arithmetic element are a continuous value and a discrete value, respectively; a characteristic arithmetic element has a continuous value to be compared, as a parameter; the output value thereof changes discretely depending on the magnitude relationship between the inputted continuous value and the parameter. Specifically, the upper limit monitor 107, the lower limit monitor 108, or the combination of them is a characteristic arithmetic element.

Processing, to be monitored through a static test, in a monitoring control system is often written in a certain format in a logic drawing. For example, as the logic drawing LG1 illustrated in FIG. 3, the upper limit monitor 16 and the lower limit monitor 13 are provided as arithmetic elements; the analogue value from a temperature sensor (input point 11) to be monitored is connected, as an input, to the upper limit monitor 16 and the lower limit monitor 13; as a parameter for the processing node, a threshold value (a upper limit value or a lower limit value) is given to the upper limit monitor 16 and the lower limit monitor 13; then, a digital signal indicating an abnormally high temperature or an abnormally low temperature is extracted from each of their outputs (output points 15 and 16).

Because analogue values to be monitored closely relate to hardware such as various kinds of sensors, the input specifications thereof are often determined by a higher specification or a hardware specification; therefore, it can be expected that those analogue values can be acquired from these specifications. Accordingly, in the present invention, attention is focused on the characteristic of the static test of a monitoring control system and the characteristic of description method for a logic drawing so that a test table is automatically created.

Figure 6:
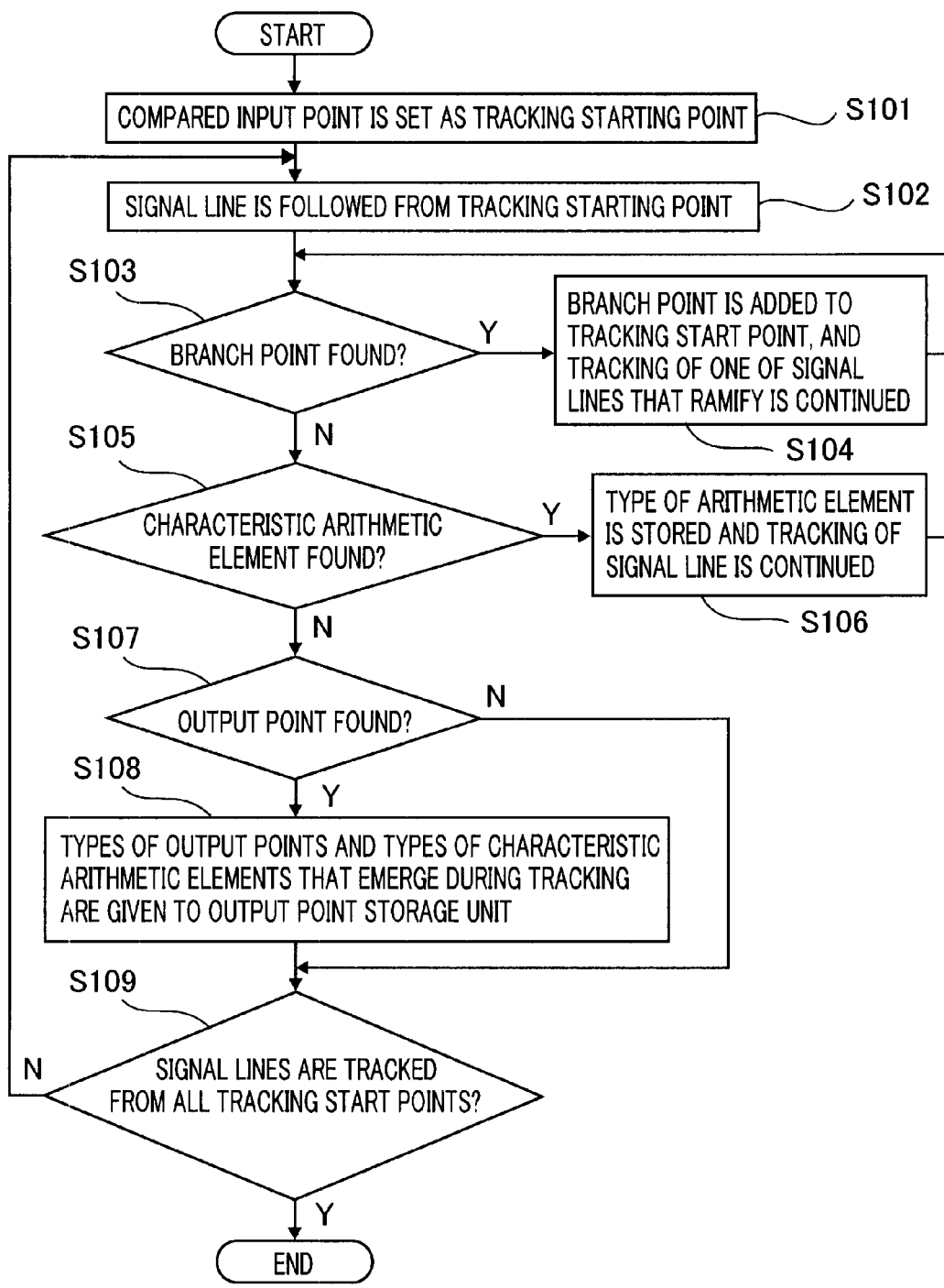
FIG. 6 is a flowchart representing the operation of a signal line tracking unit 4 and an arithmetic element detection unit 5 in FIG. 1.
Figure 7:
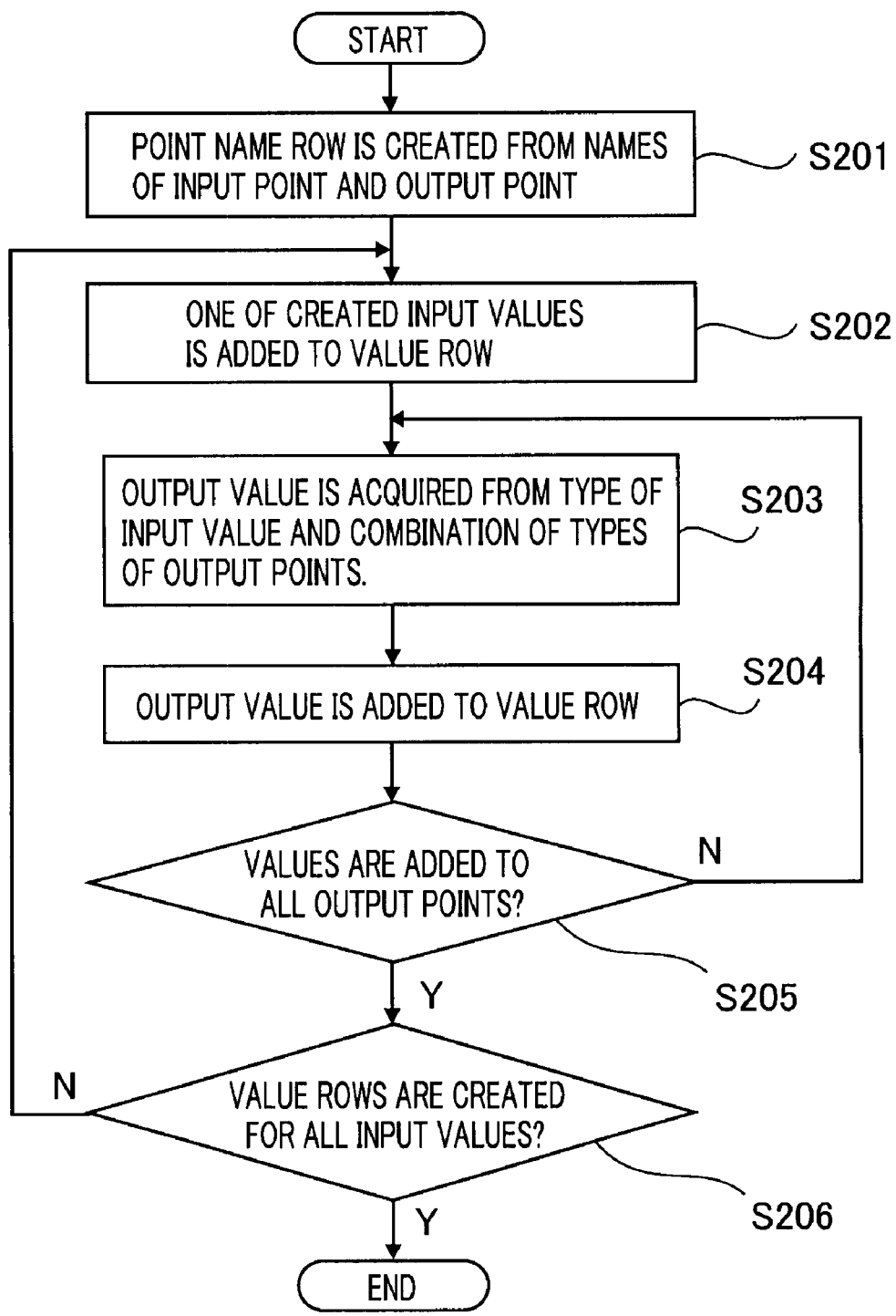
FIG. 7 is a flowchart representing the operation of a table creation unit 9 in FIG. 9.

The operation of a test table creation system will be explained with reference to a flowchart. FIG. 6 is a flowchart representing the operation of the signal line tracking unit 4 and the arithmetic element detection unit 5 in the test table creation system; FIG. 7 is a flowchart representing the operation of the table creation unit 9 in the test table creation system. With reference to FIG. 6, there will be explained the operation of the signal line tracking unit 4 and the arithmetic element detection unit 5 in the test table creation system.

In the step S101, the compared input point is set as the tracking start point. Next, in the step S102, a signal line is followed from the tracking start point. In the step S103, in the case where a branch point is found, the step S103 is followed by the step S104; in other cases, the step S103 is followed by the step S105. In the step S104, the branch point is added to tracking start points, and tracking of one of the signal lines that ramify is continued; then, the step S104 is followed by the step S103. In the step S105, in the case where a characteristic arithmetic element is found, the step S105 is followed by the step S106; in other cases, the step S105 is followed by the step S107. In the step S106, the type of the arithmetic element is stored, and tracking of the signal line is continued; then, the step S106 is followed by the step S103. In the step S107, in the case where an output point is found, the step S107 is followed by the step S107; in other cases, the step S107 is followed by the step S109. In the step S108, the types of output point and the types of characteristic arithmetic elements that emerge during the tracking are given to the output point storage unit 7. Next, in the step S109, it is checked whether or not signal-line tracking from all tracking start points has been completed; if that is the case, the processing is ended, and otherwise, the step S109 is followed by the step S102.

With reference to FIG. 7, there will be explained the operation of the table creation unit 9 in the test table creation system. The table creation unit 9 creates a test table represented in FIG. 12 through a procedure explained later. In FIG. 7, in the step S201, the point-name rows of the test table are created from the names of the input point and the output point. Next, in the step S202, one of created input values is added to a value row. Next, in the step S203, the output value is acquired from the type of the input value and the combination of the types of output points. Next, in the step S204, the output value is added to the value row. Next, in the step S205, it is determined whether or not values have been added to all the output points; if that is the case, the step 205 is followed by the step S206, and otherwise, the step 205 is followed by the step

203. In the step S205, it is determined whether or not the value rows for all the input values have been created; if that is not the case, the step 205 is followed by the step S202; if that is the case, the processing is ended.

Next, with reference to the logic drawing LG1 illustrated in FIG. 3, the operation of the test table creation system will be explained. In the logic drawing storage device 1, the logic drawing LG1 is stored; in the input specification storage device 2, an input specification ITB1 represented in FIG. 8 is stored. FIG. 8 is an example of input specification stored in the input specification storage device 2. In the input specification ITB1, there are described an upper limit value and a lower limit value that are determination criteria for the temperature, indicated by a thermometer A, which corresponds to the input point 11.

The input point comparison unit 3 acquires the logic drawing LG1 from the logic drawing storage device 1 and the input specification ITB1 from the input specification storage device 2, performs comparison between input points, and then finds the input point 11 in the logic drawing LG1. The signal line tracking unit 4 and the arithmetic element detection unit 5 give output-point information OTB1 (refer to FIG. 9), which is information for an output point, to the output point storage unit 7, based on information from the logic drawing LG1 and the input point comparison unit 3. With reference to the flowchart in FIG. 6, there will be explained the operation of the signal line tracking unit 4 and the arithmetic element detection unit 5.

At first, in the step S101, the compared input point 11 is set as the tracking start point. In the step S102, the signal line 12 is tracked from the input point 11, and in the step S103, the branch point CP1 is found. In the step S104, the branch point CP1 is stored, and tracking of any one (the signal line 12*a*, in the present embodiment) of signal lines that ramify is continued; in the step S105, the lower limit monitor 13, which is a characteristic arithmetic element, is found. In the step S106, the parameter for the lower limit monitor 13 is categorized into the "lower limit" and then stored. The tracking of the signal line 14 is further continued so that the signal line 14 is followed. Next, in the step S107, the output point 15 is found; in the step S108, an output point name "A abnormally low temperature alarm signal", which is a parameter for the output point 15, and the type "the lower limit" of the lower limit monitor 13 are given to the output point storage unit 7.

Because the signal line 12*b*, which ramifies rightward from the branch point CP1, has not been tracked, the result of the condition determination in the step S109 becomes "NO" (expressed by "N" in FIG. 6); therefore, in the step S102, tracking of an untracked signal line (the signal line 12*b*, in the present embodiment) is resumed from the tracking start point. In such a way as described above, the upper limit monitor 16, which is a characteristic arithmetic element, and the output point 18 are found through the processing in the steps S103, S105, and S107. In the step S108, an output point name "A abnormally high temperature alarm signal", which is a parameter for the output point 18, and the type "upper limit" of the upper limit monitor 16 are given to the output point storage unit 7. After that, the result of the condition determination in the step S109 becomes "YES" (indicated by in FIG. 6), and then the processing is ended. FIG. 9 represents the summary of the output-point information OTB1 that is given to the output point storage unit 7. FIG. 9 is an example of output-point information stored in the output point storage unit 7.

From the input point comparison unit 3, the input value creation unit 8 acquires the input name of the input point 11 that has been compared by the input point comparison unit 3, acquires a lower limit value and an upper limit value from the input specification ITB1, for the input point 11, which is stored in the input specification storage device 2, and creates an input value to be utilized in testing, so that there is created input-value information OTB2 (input value creation procedure) that includes respective input values for input value types into which analogue values, which are inputs, are categorized. In the present embodiment, as an example of input value, there are created five values as represented in FIG. 10, i.e., a smaller-than-lower-limit value, a lower limit value, a middle value, an upper limit value, and a larger-than-upper-limit value. FIG. 10 represents the values and the types thereof created in this situation. FIG. 10 is an example of input-value information created by the input value creation unit 8.

The output value creation unit 6 compares the output-point information OTB1 stored in the output point storage unit 7 with the input-value information OTB2 created in the input value creation unit 8 so as to calculate respective correct output values vs. the types of input values, for the types of output values (for each of the output points 15 and 18) (output value creation procedure). FIG. 11 represents output-value information OTB3, which is a table for the calculated output-point values. FIG. 11 is an example of output-value information created by the output value creation unit 6.

In response to the results in the output value creation unit 6 and the input value creation unit 8, the table creation unit 9 creates a test table TTB1. The operation of the table creation unit 9 in this situation will be explained with reference to the flowchart in FIG. 7. In the step S201, in the point-name row, there are created the input point name "temperature A" of the input point 11, the output point name "A abnormally low temperature alarm signal" of the output point 15, and the output point name "A abnormally high temperature alarm signal" of the output point 18. In the step S202, "−1", which is one of the input values, is added to a value row. In the step S203, an output value "1" is acquired from the type "smaller-than-lower-limit value", which is the type of an input value, the type "lower limit" of the output point 15 ("A abnormally low temperature alarm signal"), and the output-value information OTB3 represented in FIG. 11. In the step S204, the output value "1" is added to a value row. In the steps S205 and S206, respective value rows are acquired for all the input values and all the output points, so that the test table TTB1 is created. FIG. 12 represents the test table TTB1 that is created in the present embodiment. FIG. 12 is an example of test table created by the table creation unit 9. The test table storage device 10 stores the test table TTB1 created by the table creation unit 9.

The test table TTB1 is represented by a table in which the columns are the point names of the input point 11 and the output points 15 and 18, and the rows are the input values of the input point 11 and the output values, of the output points 15 and 18, that correspond to the respective input values of the input point 11; therefore, discrimination can be performed by looking at the point names of the input point 11 and the output points 15 and 18.

The test table creation system according to Embodiment 1 acquires from the input specification storage device 2 the input point 11 and the specification ITB1 therefor (the upper limit value, the lower limit value, and the like) of the logic drawing LG1 and tracks the logic drawing LG1 from the input point 11, so that the characteristic arithmetic elements (the lower limit monitor 13 and the upper limit monitor 16) are detected. The output points 15 and 18 situated at the downstream side of the characteristic arithmetic elements are identified, and the value at the input point 11 and the expected values, corresponding to that value, at the output points 15 and 18 are automatically created and then recorded in the test table TTB1. Accordingly, manual creation and management of a test table TTB1 are not required, whereby manual work related to testing is significantly reduced.

Because having the signal line tracking unit 4, the logic drawing analysis unit 20 can track a signal line described in the logic drawing LG1, in a direction (in the downstream direction) in which the signal flows and in a direction (in the upstream direction) that is opposed to the downstream direction. Because having the arithmetic element detection unit 5, the logic drawing analysis unit 20 can detect the type of and the parameter for an arithmetic element, whereby selection of order of signal tracking and creation of output-point information OTB1 can appropriately be performed. Because having the input point comparison unit 3, the logic drawing analysis unit 20 can accurately detect the input point of the input specification ITB1 in the logic drawing LG1 and then perform comparison.

The test table creation system according to Embodiment 1 extracts information from both the logic drawing LG1 and the specification ITB1 and then creates the test table TTB1 for a static test; therefore, even in the case where there exist a great number of analogue values to be monitored, appropriate input values and the corresponding expected values can efficiently be created. With regard to an appropriate input value, because, based on the input point 11 and threshold values (the upper limit value and the lower limit value) described in the specification ITB1 for the input point 11, the threshold value, a value above the threshold value, and a value above the threshold value are selected; thus, the test table creation system can create a necessary and sufficient number of input values. Because the expected values of the output points 15 and 18 for the necessary and sufficient number of input values can also be created, the test table creation system can create the test table TTB1 for an appropriate static test.

As described above, in the test table creation system according to Embodiment 1, there are provided the logic drawing analysis unit 20 that analyzes the logic drawing LG1 stored in the logic drawing storage device 1; the input value creation unit 8 that creates an input value for each of the input value types into which analogue values are categorized, based on the input point 11 of the logic drawing LG1 derived by the logic drawing analysis unit 20 and the input specification ITB1 for the logic drawing LG1 stored in the input specification storage device 2; the output value creation unit 6 that creates the respective expected values corresponding to the input values created in the input value creation unit 8, for the output points 15 and 18 that correspond to the types of arithmetic elements derived by the logic drawing analysis unit 20; and the table creation unit 9 that creates the test table TTB1, based on the input value created by the input value creation unit 8 and the expected value created by the output value creation unit 6, and based on the input specification for a logic drawing and the result of analysis performed by the logic drawing analysis unit, there is created a test table that includes input values, which are analogue values, and the expected values of processing outputs; therefore, the test table TTB1 for a static test can efficiently be created.

In the test table creation system according to Embodiment 1, there are provided an input value creation procedure for creating an input value for each of the input value types into which analogue values are categorized, based on the input point 11 of the logic drawing LG1 derived by analyzing the logic drawing LG1 and the input specification ITB1 for the logic drawing LG1; an output value creation procedure for creating the respective expected values corresponding to the input values created through the input value creation procedure, for the output points 15 and 18 that correspond to the types of arithmetic elements derived by analyzing the logic drawing; and a table creation procedure for creating the test table based on the input value created through the input value creation procedure and the expected value created through the output value creation procedure, and based on the input specification for a logic drawing and the result of analysis performed by the logic drawing analysis unit 20, there is created a test table that includes input values, which are analogue values, and the expected values of processing outputs; therefore, the test table TTB1 for a static test can efficiently be created.

In the present embodiment, there has been explained creation of a test table with reference to an extremely simple logic drawing as illustrated in FIG. 3; however, the present invention is not limited to this kind of simple case. The signal line tracking unit 4 tracks each of branches, and the arithmetic element detection unit 5 detects an arithmetic element. For example, when the operation scale in a module becomes large, it is difficult to describe the behavior in a single drawing; therefore, the operation is often expressed with a plurality of drawings. In that situation, in each of the drawings, a signal from another drawing and a signal to another drawing are each expressed with a symbol. When, during its tracking of a signal line, such a symbol appears, the signal line tracking unit 4 performs tracking of the signal line in such a way that the plurality of drawings are covered.

It is conceivable that, when the arithmetic element detection unit 5 finds an output point or an arithmetic element other than a characteristic arithmetic element, with regard to an element, such as the logical negation 103, whose output value can be converted into an input value, the conversion rule is stored, and when values are created in creating a test table, the converted value is described in accordance with the conversion rule. For example, in the case where the logical negation 103 is inserted between the lower limit monitor 13 and the output point 15 in FIG. 3, application of this scheme brings about a test table that is obtained by inverting "0" and "1" in the value of the output point name "A abnormally low temperature alarm signal" in FIG. 12 into "1" and "0", respectively.

Embodiment 2

Figure 13:
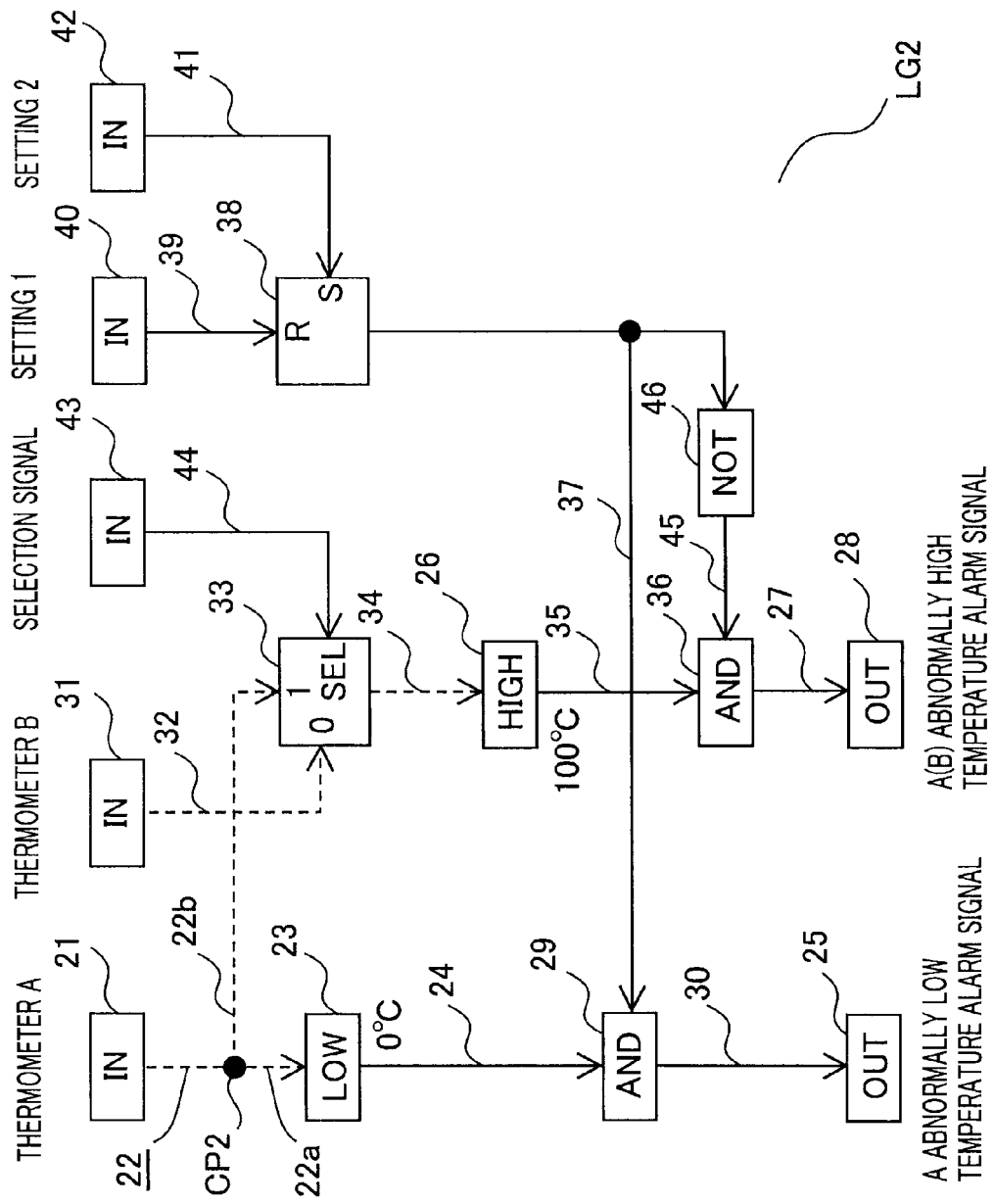
FIG. 13 is a diagram illustrating an example of logic drawing for a module, according to Embodiment 2 of the present invention.

In Embodiment 2, there will be explained a test table creation method for a module described with a complicated logic drawing having an arithmetic element, the number of inputs of which is two or more. FIG. 13 is a diagram illustrating an example of logic drawing for the module 50a (refer to FIG. 2) according to Embodiment 2. The processing illustrated in FIG. 13 is to generate an alarm signal corresponding to a setting condition in the case where the temperature of a predetermined point of the device 51a is abnormal. A logic drawing LG2 in FIG. 13 is an example where fourteen arithmetic elements are utilized. The logic drawing LG2 has five input points 21, 31, 43, 40, and 42 and two output points 25 and 28.

A system 1 consisting of an input point 21, a signal line 22, a lower limit monitor 23, a signal line 24, a logical sum 29, a signal line 30, and the output point 25 generates an abnormally low temperature alarm signal for a thermometer A. A system 2 consisting of the input point 21 or an input point 31, an analogue selector 33, a signal line 34, an upper limit monitor 26, a signal line 35, a logical sum 36, a signal line 27, and an output point 28 generates an abnormally high temperature alarm signal for a thermometer B. The thermometer B is a subsidiary thermometer; when the thermometer A fails, there is performed switching of the thermometer from the thermometer A to the thermometer B through a selection signal (input point 43). In response to the selection signal (input point 43), the analogue selector 33 performs switching between the input point 21 (thermometer A) connected with the signal line 22 and the input point 31 (thermometer B) connected with a signal line 32.

A polarity designation system consisting of the input point 40, a signal line 39, the input point 42, a signal line 41, an RS flip-flop 38, a signal line 37, a logical negation 46, and a signal line 45 transmits a signal for changing the polarities of the signals at the output points 25 and 28. Through setting 1 at the input point 40 and setting 2 at the input point 42, the signal (signal line 37) of the RS flip-flop 38 is changed, and through the logical sum 29 connected with the signal line 37 and the logical sum 36 to which a signal (signal line 45) inverted by the logical negation 46 is inputted, the polarities of the signals at the output points 25 and 28 are changed. The logical sums 29 and 36, the analogue selector 33, and the RS flip-flop 38 are each an arithmetic element, the number of inputs of which are two or more.

Figure 14A:
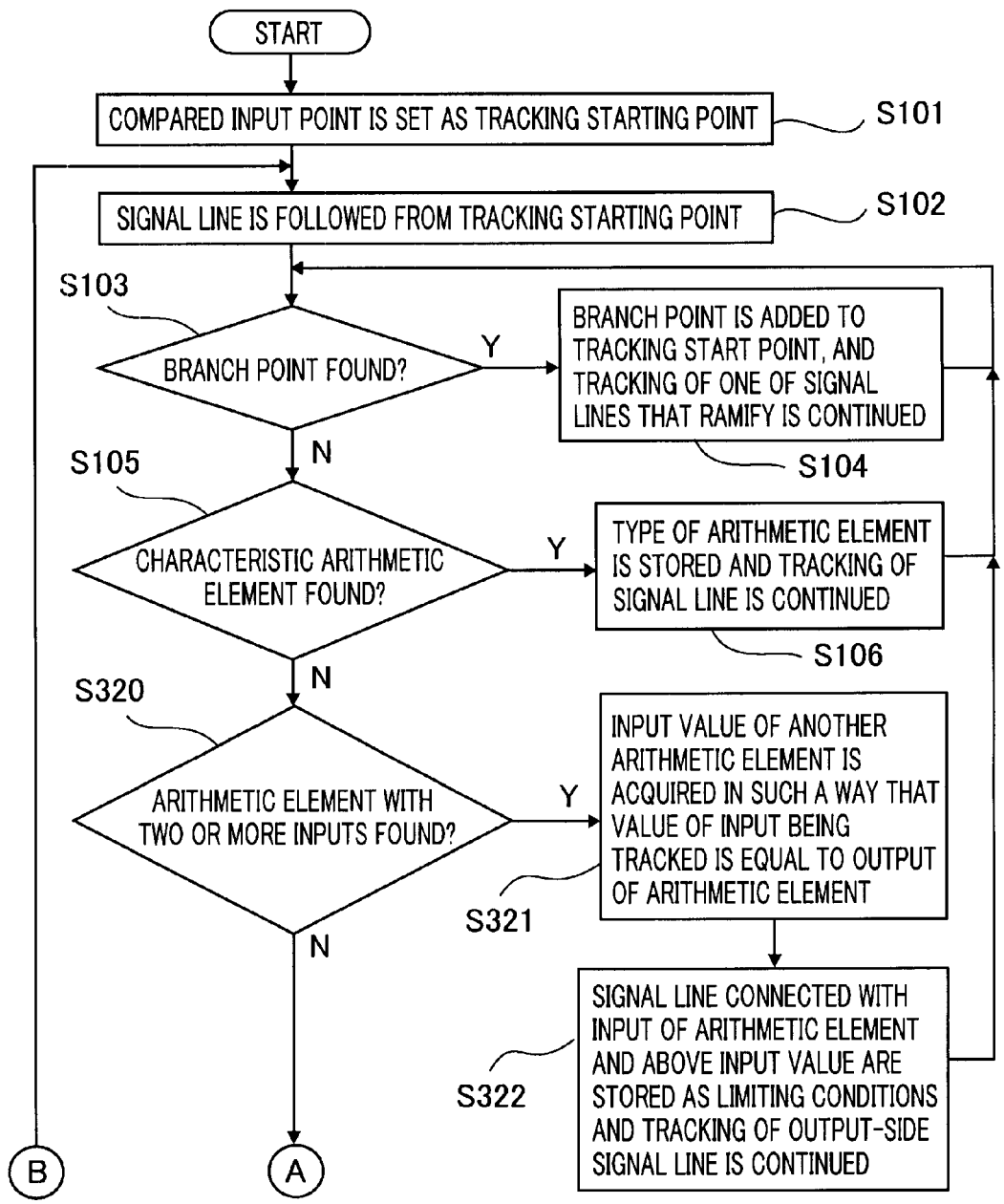
FIG. 14 is a flowchart representing the operation of a signal line tracking unit 4 and an arithmetic element detection unit 5 according to Embodiment 2.
Figure 14B:
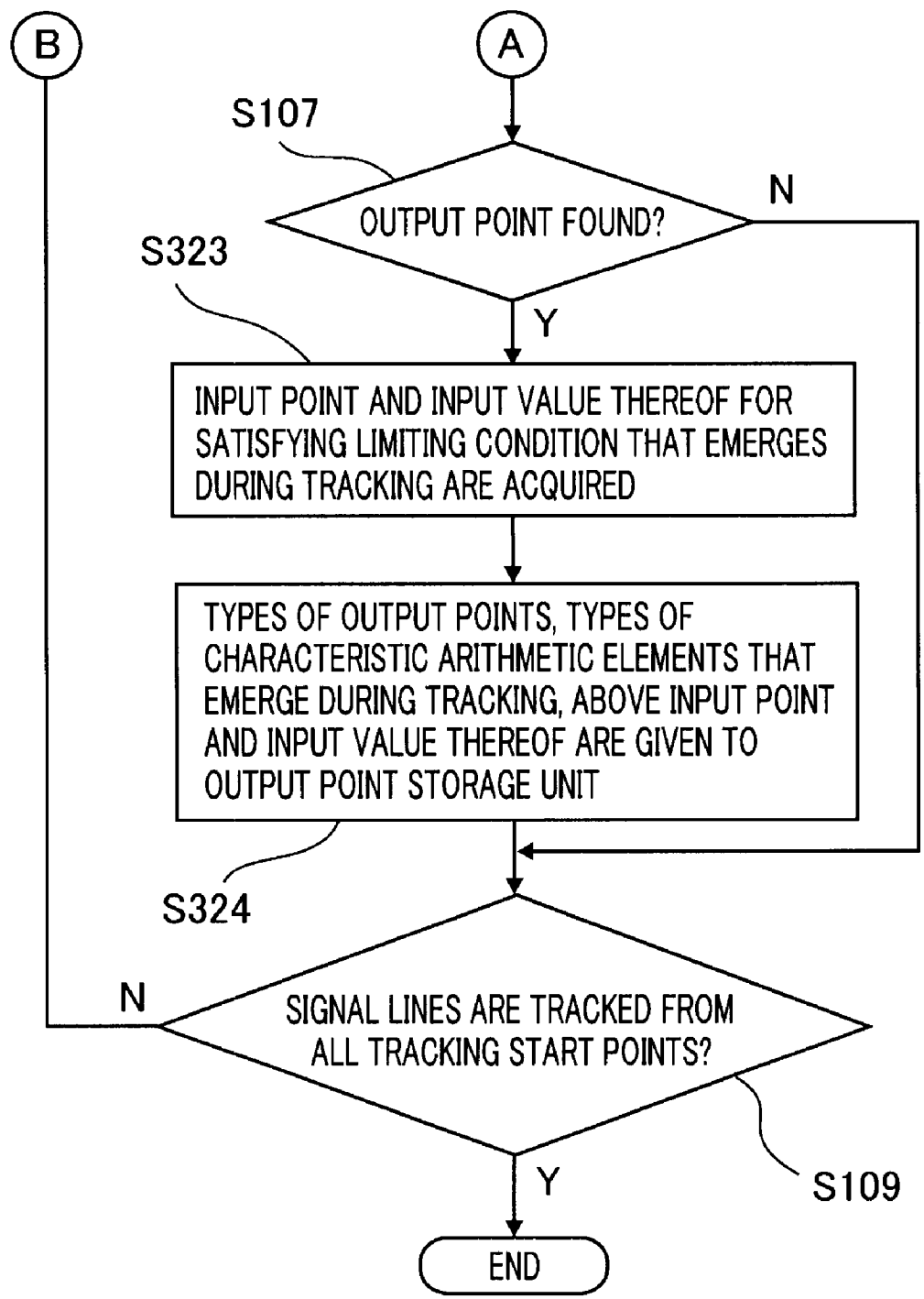
Figure 15:
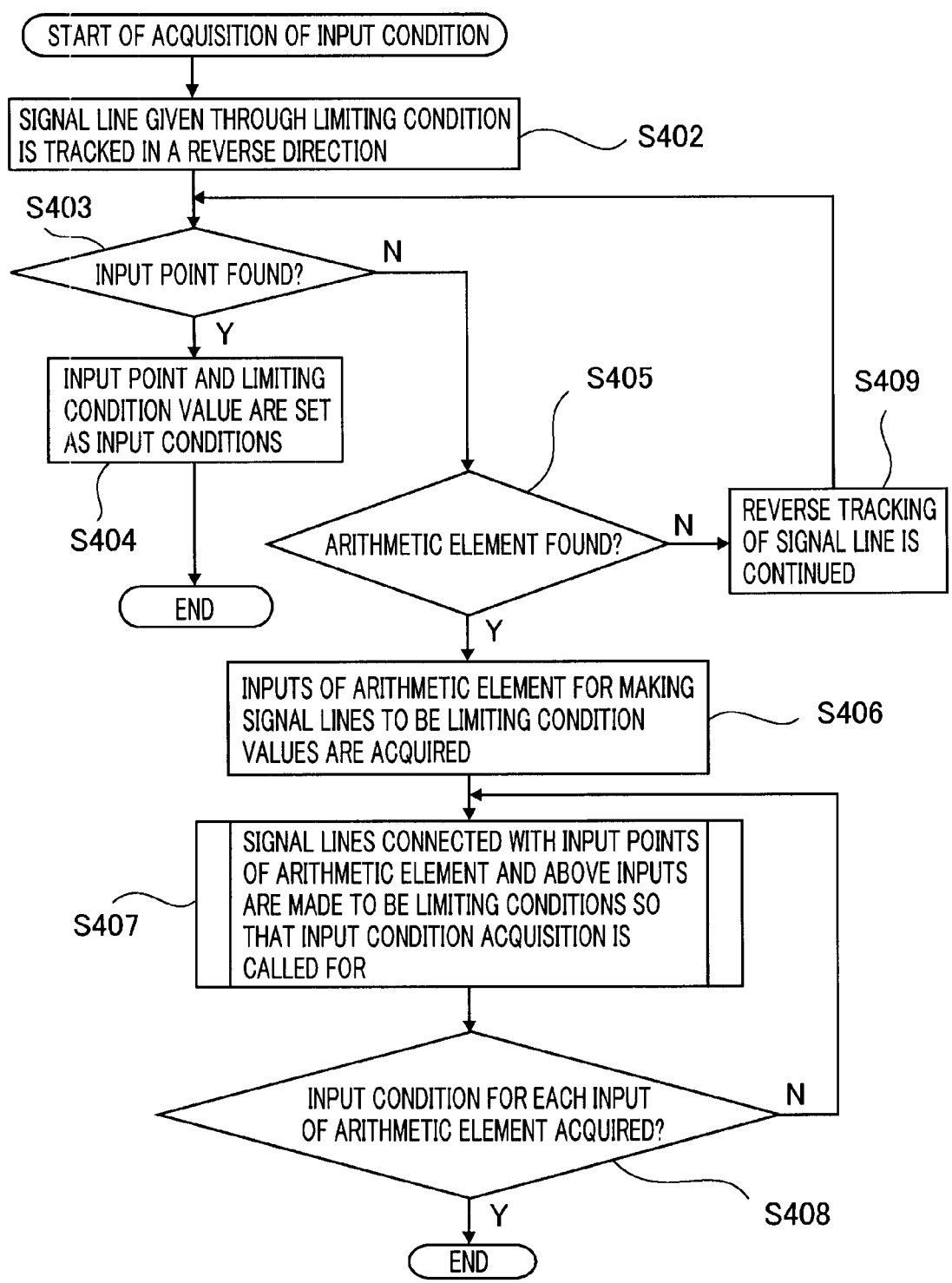
FIG. 15 is a flowchart representing the processing in the step S323 in FIG. 14.
Figure 16:
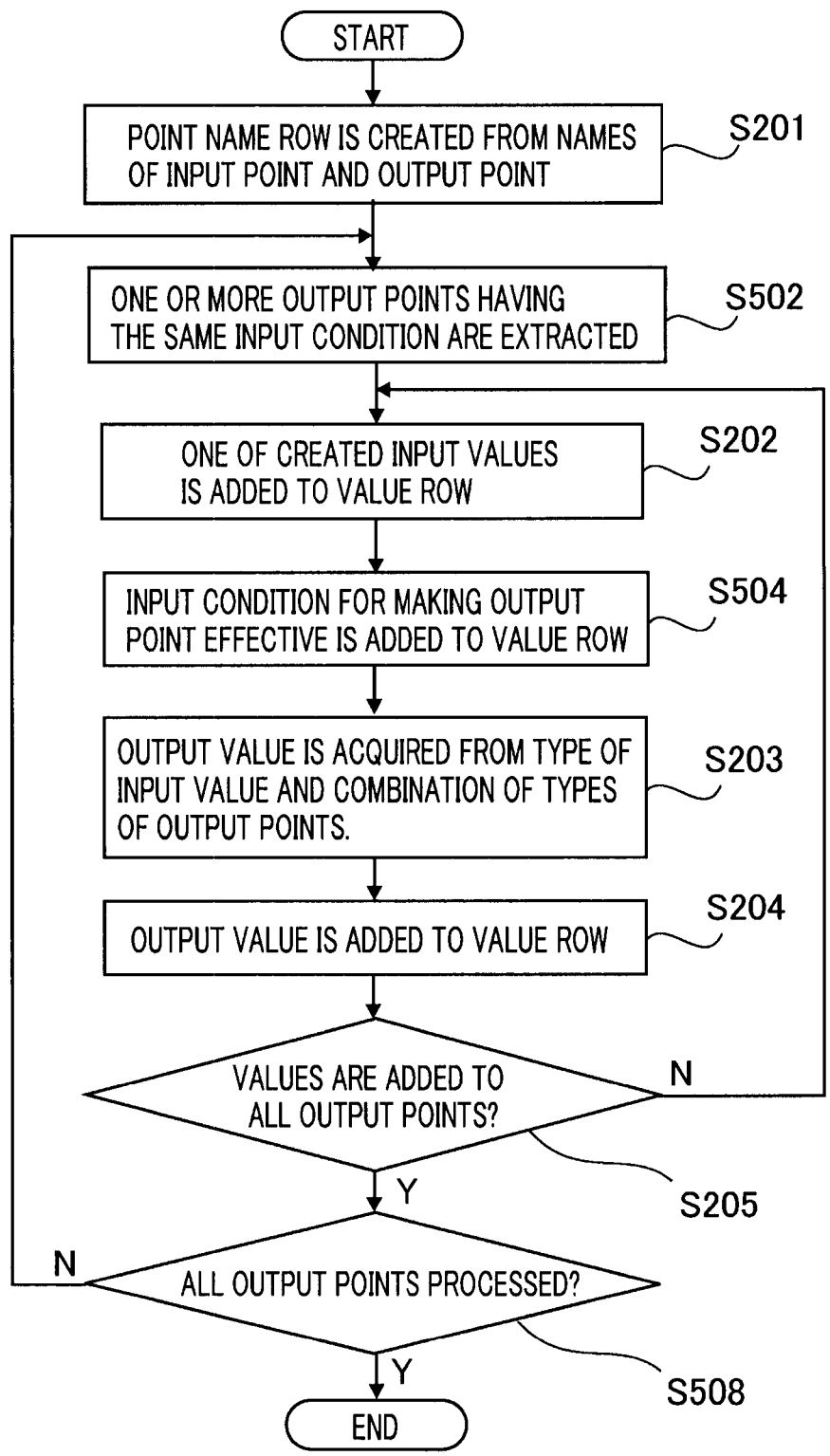
FIG. 16 is a flowchart representing the operation of a table creation unit 9 according to Embodiment 2.

The operation of a test table creation system according to Embodiment 2 will be explained with reference to a flowchart. FIG. 14 is a flowchart representing the operation of the signal line tracking unit 4 and the arithmetic element detection unit 5 in the test table creation system according to Embodiment 2; FIG. 15 is a flowchart representing the processing in the step S323 in FIG. 14. FIG. 16 is a flowchart representing the operation of the table creation unit 9 in the test table creation system according to Embodiment 2. With reference to FIG. 14, there will be explained the operation of the signal line tracking unit 4 and the arithmetic element detection unit 5 in the test table creation system. The flowchart in FIG. 14 differs from the flowchart in FIG. 6, which represents the operation of the signal line tracking unit 4 and the arithmetic element detection unit 5, in that it has the steps S323 and S324 instead of the step S108 in FIG. 6 and that the steps S320, S321, and S322 are added thereto.

In the step S101, the compared input point is set as the tracking start point. Next, in the step S102, a signal line is followed from the tracking start point. In the step S103, in the case where a branch point is found, the step S103 is followed by the step S104; in other cases, the step S103 is followed by the step S105. In the step S104, the branch point is added to tracking start points, and tracking of one of the signal lines that ramify is continued; then, the step S104 is followed by the step S103. In the step S105, in the case where a characteristic arithmetic element is found, the step S105 is followed by the step S106; in other cases, the step S105 is followed by the step S320. In the step S106, the type of the arithmetic element is stored, and tracking of the signal line is continued; then, the step S106 is followed by the step S103. In the step S320, it is determined whether or not an arithmetic element with two or more inputs has been found; if that is the case, the step S320 is followed by the step S321; in other cases, the step S320 is followed by the step S107.

In the step S321, the input value of another arithmetic element is acquired in such a way that the value of input being tracked is equal to the output of the arithmetic element. Next, in the step S322, the signal line connected with the input of the arithmetic element and the above input value are stored as limiting conditions and tracking of the output-side signal line is continued; then, the step S322 is followed by the step S103. In the step S107, it is determined whether or not an output point has been found; if that is the case, the step S107 is followed by the step S323; in other cases, the step S107 is followed by the step S109. In the step S323, there are acquired an input point and the input value thereof for satisfying a limiting condition that emerges during tracking. Next, in the step S324, the types of output points, types of characteristic arithmetic elements that emerge during tracking, the above-acquired input point and the input value thereof are given to the output point storage unit 7. Next, in the step S109, it is determined whether or not signal-line tracking from all tracking start points has been completed; if that is the case, the processing is ended, and otherwise, the step S109 is followed by the step S102.

The processing in the step S323 will be explained in detail with reference to FIG. 15. Firstly, a signal line given through a limiting condition is tracked in a reverse direction. Next, in the step S403, it is determined whether or not an input point has been found; if that is the case, the step S403 is followed by the step S404; in other cases, the step S404 is followed by the step S405. In the step S404, the input point and the value of the limiting condition are set as input conditions, and then the processing is ended. In the step S405, it is determined whether or not an arithmetic element has been found; if that is the case, the step S405 is followed by the step S406; in other cases, the step S405 is followed by the step S409. In the step S406, there are acquired the inputs of the arithmetic element for making a signal line to be the value of a limiting condition. Next, in the step S407, signal lines connected with the input points of the arithmetic element and the above-acquired inputs are made to be a limiting condition so that the input condition acquisition (this flowchart) is called for. In the step S408, it is determined whether or not the input condition for each input of the arithmetic element has been completed; if that is the case, the processing is ended, and otherwise, the step S408 is followed by the step S407. In the step S409, the reverse tracking of the signal line is continued; then, the step S409 is followed by the step S403.

With reference to FIG. 16, there will be explained the operation of the table creation unit 9 in the test table creation system according to Embodiment 2. The table creation unit 9 creates a test table represented in FIG. 19 through a procedure explained later. The flowchart in FIG. 16 differs from the flowchart in FIG. 7, which represents the operation of the table creation unit 9 according to Embodiment 1, in that it has the step S508 instead of the step S206 in FIG. 7 and that the steps S502 and S504 are added thereto.

In FIG. 16, in the step S201, the point-name rows of the test table are created from the names of the input point and the output point. Next, in the step S502, one or more output points having the same input condition are extracted. Next, in the step S202, one of created input values is added to a value row. Next, in the step S504, an input condition for making the output point effective is added to the value row. Next, in the step S203, the output value is acquired from the type of the input value and the combination of the types of output points. Next, in the step S204, the output value is added to the value row. Next, in the step S205, it is determined whether or not values have been added for all output points (value rows have been created for all input values); if that is the case, the step S205 is followed by the step S508, and otherwise, the step S205 is followed by the step S202. In the step S508, it is determined whether or not all output points have been processed; if that is the case, the processing is ended, and otherwise, the step S508 is followed by the step S502.

Next, with reference to the logic drawing LG2 illustrated in FIG. 13, the operation of the test table creation system will be explained. The logic drawing LG2 is stored in the logic drawing storage device 1, and in the input specification storage device 2, there is stored the input specification ITB1, which is the same as that, represented in FIG. 8, of Embodiment 1.

The input point comparison unit 3 acquires the logic drawing LG2 from the logic drawing storage device 1 and the input specification ITB1 from the input specification storage device 2, performs comparison between input points, and then finds the input point 21 in the logic drawing LG2. The signal line tracking unit 4 and the arithmetic element detection unit 5 give output-point information OTB4 (refer to FIG. 17), which is information for an output point, to the output point storage unit 7, based on information from the logic drawing LG2 and the input point comparison unit 3. With reference to the flowchart in FIG. 14, there will be explained the operation of the signal line tracking unit 4 and the arithmetic element detection unit 5.

At first, in the step S101, the compared input point 21 is set as the tracking start point. In the step S102, the signal line 22 is tracked from the input point 21, and in the step S103, the branch point CP2 is found. In the step S104, the branch point CP2 is stored, and tracking of any one (the signal line 22a, in the present embodiment) of signal lines that ramify is continued; in the step S105, the lower limit monitor 23, which is a characteristic arithmetic element, is found. In the step S106, the parameter for the lower limit monitor 23 is categorized into the "lower limit" and then stored. The tracking of the signal line 24 is further continued so that the signal line 24 is followed. Next, in the step S320, the logical sum 29, which is an arithmetic element, is found; in the step S321, there is calculated the fact that it is required that the other input of the logical sum 29 is "1" so that the output of the logical sum 29 becomes equal to the input thereof that is being tracked; in the step S322, the limiting condition "the signal line 37 becomes "1" is obtained and stored; then, the signal line 30 is tracked. Next, in the step S107, the output point 25 is found; in the step S323, there are acquired an input point and the input value thereof for satisfying the limiting condition "the signal line 37 becomes "1".

With reference to the flowchart in FIG. 15, there will be explained the contents of the processing in the step S323 in the case where the limiting condition "the signal line 37 becomes "1" is given in the logic drawing LG2. Firstly, in the step S402, the signal line 37 given through the limiting condition is tracked in a reverse direction; in the step S405, the arithmetic element 38 is found. It can be seen from FIG. 4 that the arithmetic element 38 is an RS flip-flop; in the step S406, from FIG. 5, there is obtained the input condition (R=0, S=1) for obtaining the output value "1".

In the step S407, there are obtained, as the limiting condition, the signal line 39 connected with the input point R of the RS flip-flop and the value "0" in that situation, and then the processing in FIG. 15 is recursively called for. In the step S402, the signal line 39 given through the limiting condition is tracked in a reverse direction, and then in the step S403, the input point 40 is found. The input point name "setting 1" of the input point 40 and the value "0" thereof are obtained as the input condition, and then the processing is ended. The step S407 is resumed, and the result of the determination in the step S408 becomes "NO"; then, in the step S407, also for the signal line at the S side, the processing represented in FIG. 15 is recursively called for; then, the input point name "setting 2" of the input point 42 and the value "1" thereof are obtained, and the processing is ended. The step S407 is resumed, and the result of the determination in the step S408 becomes "YES"; then, the processing is ended. The combination of the input point values obtained in this situation is an input condition. FIG. 18 represents input-condition information OTB5 that includes the respective values of the input points. FIG. 18 is an example of input-condition information acquired in the step S323.

Next, in the step S324 represented in FIG. 14, the output point name "A abnormally low temperature alarm signal", which is a parameter for the output point 15, the type "lower limit;" of the lower limit monitor 23, the input value "0" for the input point name "setting 1" of the input point 40, and the input value "1" for the input point name "setting 2" of the input point 42 are given to the output point storage unit 7. Because the signal line 22b, which ramifies rightward from the branch point CP2, has not been tracked, the result of the condition determination in the step S109 becomes "NO"; therefore, in the step S102, tracking of an untracked signal line (the signal line 12b, in the present embodiment) is performed from the tracking start point.

The results of determinations in the steps S103 and S105 become "NO", and in the step S320, the arithmetic element 33 (analogue selector in FIG. 4) is found. In the step S321, the condition with which the signal line 34 becomes equal to the signal line 22b is "SEL=1"; therefore, in the step S322, "the signal line 44=1" is stored as the limiting condition; then, the signal line 34 at the output side is tracked. In the step S105, the upper limit monitor 26, which is a characteristic arithmetic element, is found; then, in the step S106, the type "upper limit" of the upper limit monitor 26 is recorded, and tracking of the signal line 35 is continued. In the step S320, the logical sum 36, which is an arithmetic element, is found, and the condition with which the signal line 35 becomes equal to the signal line 27 is that the other input of the logical sum 36 is "1"; therefore, in the step S322, "the signal line 45=1" is stored as the limiting condition; then, tracking of the signal line 27 at the output side of the logical sum 36 is continued. In the step S107, the output point 28 is found, and in the step S323, there are acquired an input point and the input value thereof for satisfying the limiting condition.

The processing in the step S323 will be explained in detail with reference to the flowchart in FIG. 15. With regard to the limiting condition "the signal line 44=1" related to the analogue selector 33, in the step S402, the signal line 44 is tracked in a reverse direction, and then in the step S403, the input point 43 is found. In the step S404, the input condition "the selection signal=1" is acquired, and then the processing is ended.

With regard to the limiting condition "the signal line 45=1" related to the analogue selector 36, in the step S402, the signal line 45 is tracked in a reverse direction, and then in the step S405, the arithmetic element 46 is found. In the step S406, the input value for making the signal line 45 to be "1" is "0"; therefore, "the signal line 37=0" is set as the limiting condition, and FIG. 15 is called for again. In the step S402, the signal line 37 is tracked in a reverse direction, and then in the step S405, the arithmetic element 38 is found. It can be seen from FIG. 4 that the arithmetic element 38 is an RS flip-flop; the condition for making the output to be "0" is that R=1, and S=0; therefore, there are obtained the limiting conditions "the signal line 39=1" and "the signal line 41=0". With regard to one (here, "the signal line 39=1") of the limiting conditions, FIG. 15 is called for again; in the step S402, the signal line 39 is tracked in a reverse direction; in the step S403, the input point 40 is found; in the step S404, the input condition "the setting 1=1" is acquired, and then the processing is ended. The result of determination in the step S408 becomes "NO"; in the step S407, with regard to the other one (here, "the signal line 41=0") of the limiting conditions, FIG. 15 is called for; in the step S402, the signal line 41 is tracked in a reverse direction; in the step S403, the input point 42 is found. In the step S404, the input condition "the setting 2=0" is acquired, and then the processing is ended.

As a result of the foregoing processing, the summary of the output-point information OTB4, which is given to the output point storage unit 7, is represented in FIG. 17. FIG. 17 is an example of output-point information stored in the output point storage unit 7 according to Embodiment 2 of the present invention. In each of the output value creation unit 6 and the input value creation unit 8, processing similar to that in Embodiment 1 is performed, and the input-value information OTB2 represented in FIG. 10 and the output-value information OTB3 represented in FIG. 11 are acquired. In the table creation unit 9, by utilizing FIGS. 10 and 11, there is created the test table TTB2 in which input conditions are described. The operation of the table creation unit 9 will be explained with reference to the flowchart in FIG. 16.

In the step S201, in the point-name row, there are created the input point name "temperature A" of the input point 21, the input point name "selection signal" of the input point 43, the input point name "setting 1" of the input point 40, the input point name "setting 2" of the input point 42, the output point name "A abnormally low temperature alarm signal" of the output point 25, and the output point name "A(B) abnormally high temperature alarm signal" of the output point 28. The thermometer B is a subsidiary thermometer; when the thermometer A fails, there is performed switching of the thermometer from the thermometer A to the thermometer B through a selection signal (input point 43); therefore, the input point name "thermometer B" of the input point 31 is omitted.

In the step S502, input conditions and one or more output points (selection signal=no condition, setting 1=0, setting 2=1, output point=[A abnormally low temperature alarm signal]) are acquired; in the step S202, "−1", which is one of the input values in the input-value information OTB2, is added to a value row. In the step S504, there are added input conditions (selection signal=no condition, setting 1=0, setting 2=1). In the step S203, an output value "1" is acquired from the type "smaller-than-lower-limit value", which is the type of an input value, the type "lower limit" of the output point 25 ("A abnormally low temperature alarm signal"), and the output-value information OTB3 represented in FIG. 11. In the step S204, the output value "1" is added to a value row. In the steps S205 and S508, respective value rows are acquired for all the input values and all the output points, so that the test table TTB2 is created. FIG. 19 represents the test table TTB2 that is created in the present embodiment. FIG. 19 is an example of test table created by the table creation unit 9 according to Embodiment 2. The test table storage device 10 stores the test table TTB2 created by the table creation unit 9.

In the test table creation system according to Embodiment 2, there are provided two or more arithmetic elements; even in the case of a module described with a complicated logic drawing where various arithmetic elements are involved between an input point and an output point, it is made possible to acquire the input point and the setting value thereof that are conditions for testing and to create a test table. Accordingly, even in the case of a module with a complicated logic drawing, manual creation and management of a test table are not required, whereby manual work related to testing is further reduced.

Embodiment 3

Figure 20:
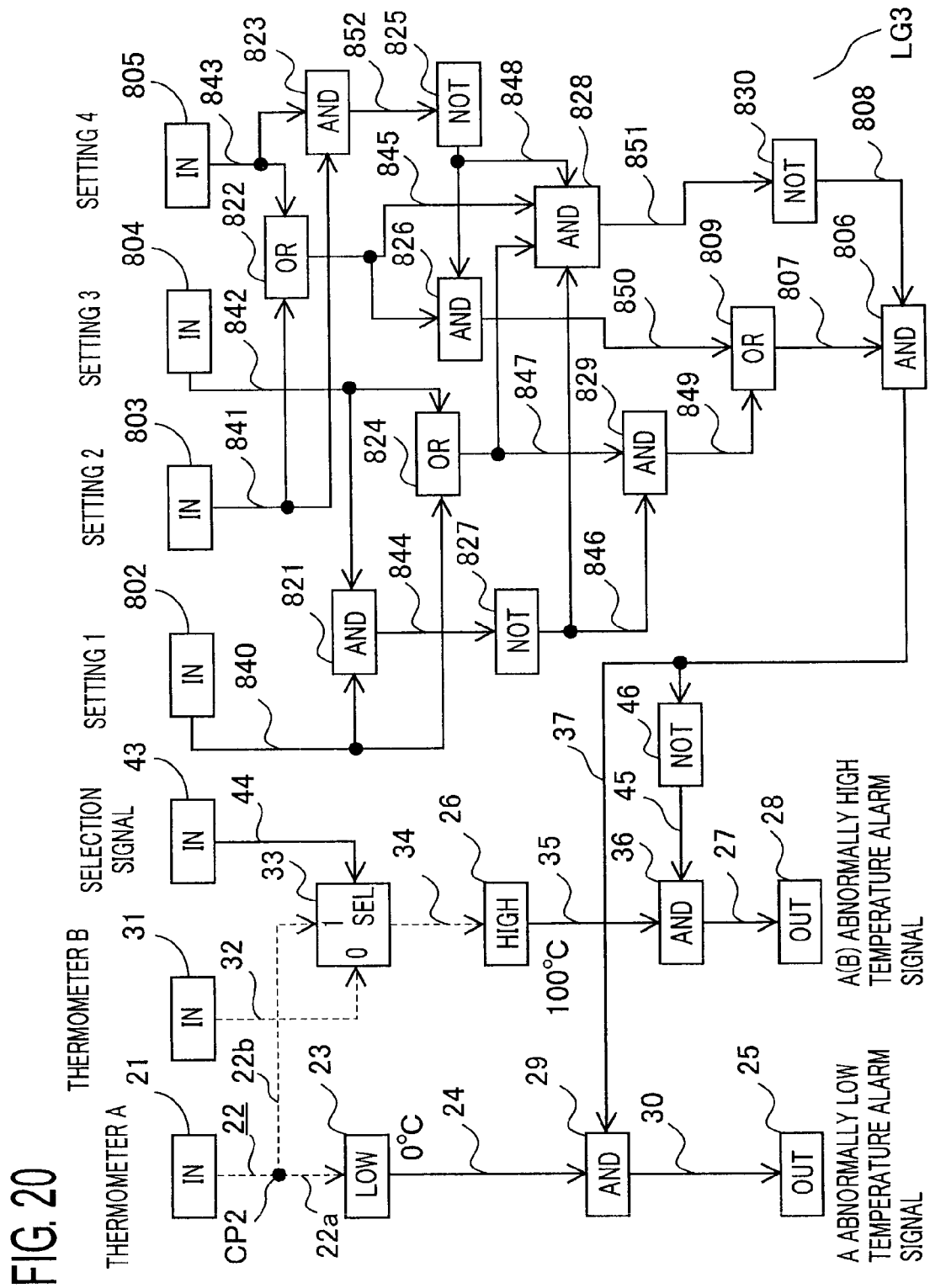
FIG. 20 is a diagram illustrating an example of a logic drawing for a module, according to Embodiment 3 of the present invention.

With regard to the logic drawing LG2 according to Embodiment 2, there has been explained a case where the number of input points, as the setting condition, is two; however, in Embodiment 3, there will be explained a test table creation method for a module described with a complicated logic drawing where, for example, there exists an input point having a great number of setting conditions. There is acquired one set of all input points that are direct or indirect inputs of an arithmetic element, so that a test table sufficient enough to perform a test is created. FIG. 20 is a diagram illustrating an example of logic drawing for the module 50a (refer to FIG. 2) according to Embodiment 3. The processing illustrated in FIG. 20 is to generate an alarm signal corresponding to a setting condition in the case where the temperature of a predetermined point of the device 51a is abnormal. A logic drawing LG3 in FIG. 20 is an example where twelve arithmetic elements for setting conditions are utilized. The logic drawing LG3 has seven input points 21, 31, 43, 802, 803, 804, and 805 and two output points 25 and 28. The logic drawing LG3 differs from the logic drawing LG2 (FIG. 13) according to Embodiment 2 in that the logic for creating a setting condition signal for the signal line 37 is complicated.

Figure 21A:
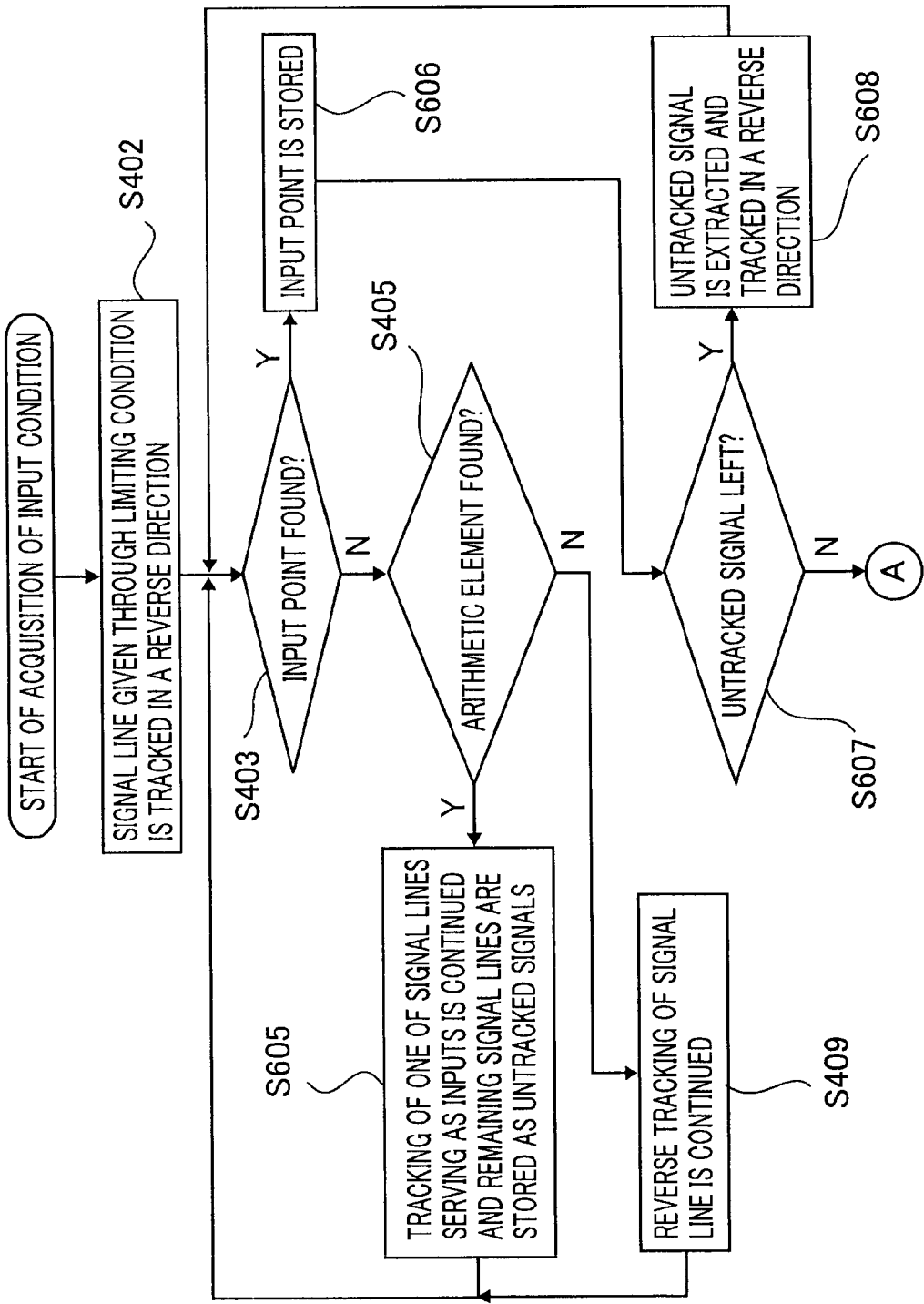
FIG. 21 is a flowchart representing the operation of input condition acquisition processing according to Embodiment 3.
Figure 21B:
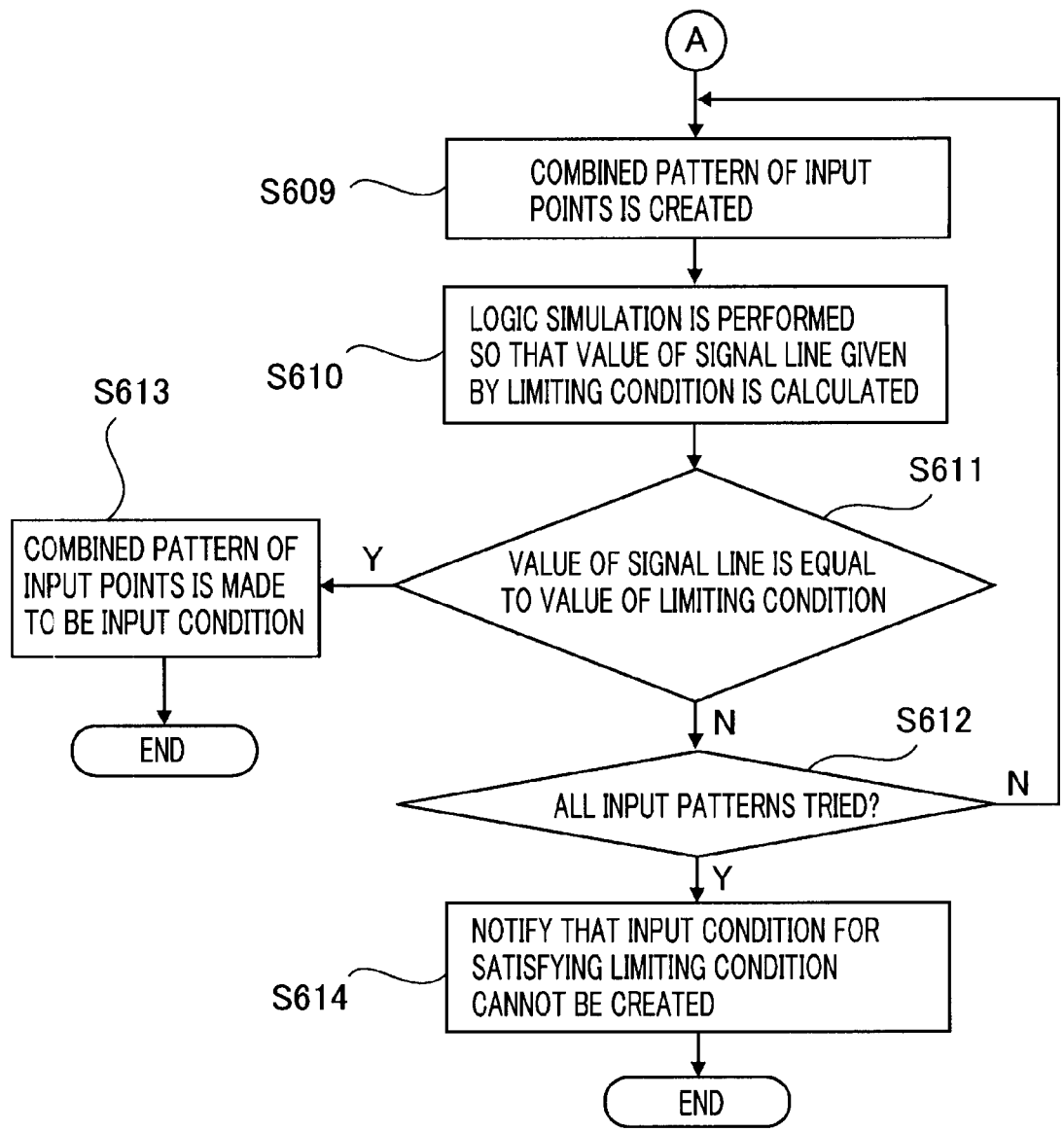

The operation of a test table creation system according to Embodiment 3 will be explained with reference to a flowchart. The flowchart representing the operation of the signal line tracking unit 4 and the arithmetic element detection unit 5 in the test table creation system is similar to the flowchart in FIG. 14 of Embodiment 2; the flowchart representing the operation of the table creation unit 9 is similar to the flowchart in FIG. 16 of Embodiment 2. The processing, in the step S323 of FIG. 14, for acquiring the input condition from a limiting condition is different from the processing in Embodiment 2. FIG. 21 is a flowchart representing the operation of input condition acquisition processing according to Embodiment 3.

In FIG. 21, a signal line given through a limiting condition is tracked in a reverse direction in the step S402. Next, in the step S403, it is determined whether or not an input point has been found; if that is the case, the step S403 is followed by the step S606; in other cases, the step S403 is followed by the step S405. In the step S405, it is determined whether or not an arithmetic element has been found; if that is the case, the step S405 is followed by the step S605; in other cases, the step S405 is followed by the step S409. In the step S409, the reverse tracking of the signal line is continued; then, the step S409 is followed by the step S403. In the step S605, the tracking of one of the signal lines, which are inputs, is continued, and the remaining signal lines are recorded as untracked signal lines; then, the step S605 is followed by the step S403. In the step S606, the input point is stored. Next, in the step S607, it is determined whether or not there exists an untracked signal line; if that is the case, the step S607 is followed by the step S608; in other cases, the step S607 is followed by the step S609. In the step S608, the reverse tracking of the untracked signal line is performed; then, the step S608 is followed by the step S403. A combined pattern of input points is created in the step S609. Next, in the step S610, logic simulation is performed so that the value of the signal line given through the limiting condition is calculated. Next, in the step S611, it is determined whether or not the value of the signal line is equal to the value of the limiting condition; if that is the case, the step S611 is followed by the step S613; in other cases, the step S611 is followed by the step S612. In the step S612, it is determined whether or not all the input patterns have been tried; if that is the case, the step S612 is followed by the step S614; in other cases, the step S612 is followed by the step S609. In the step S613, the combined pattern of input points is set as the input condition, then, the processing is ended. In the step S614, there is notified that no input condition satisfying the limiting condition can be created; then, the processing is ended.

Next, with reference to the logic drawing LG3 illustrated in FIG. 20, the operation of the test table creation system will be explained. The logic drawing LG3 is stored in the logic drawing storage device 1, and in the input specification storage device 2, there is stored the input specification ITB1, which is the same as that, represented in FIG. 8, of Embodiment 1 or 2.

The logic drawing LG3 in FIG. 20 differs from the logic drawing LG2 in FIG. 13 in that the part, of FIG. 13, that is situated at the upstream side of the signal line 37 is different from the part, of FIG. 20, that is situated at the upstream side of the signal line 37. Accordingly, up to the step S323 in FIG. 14 of Embodiment 2, the same processing is performed. The explanation for the processing up to the step S323, in which the operation of the signal line tracking unit and the arithmetic element detection unit 5 in the test table creation system is performed, is not repeated. With reference to the flowchart in FIG. 21, there will be explained the contents of the processing in the step S323 in the case where the limiting condition "the signal line 37 becomes "1" is given in the logic drawing LG3.

In the step S402, the signal line 37 given through the limiting condition is tracked in a reverse direction, and then in the step S405, a logical sum 806, which is an arithmetic element, is detected. In the step S605, tracking of a signal line 807 is continued, and a signal line 808 is recorded as an untracked signal line. An input signal line that emerges at the Left side is tracked in a reverse direction, and then in the step S403, an input point 802 is found. In the step S606, the input point is recorded. Because tracking of the signal line 808 and the like, which are the other inputs of the logical sum 806, has not been completed yet, the result of the determination in the step S607 becomes "YES"; therefore, in the step S608, one (for example, the signal line 808) of the untracked signal lines is extracted and tracked in a reverse direction. The above processing is repeated; when the determination in the step S607 becomes "NO", four input points among the input points that have been stored in the step S606 are left; the input points 802 (setting 1), 803 (setting 2), 804 (setting 3), and 805 (setting 4) are stored in an unillustrated input storage unit.

In the step S609, the potential values of the foregoing input points are combined so that an input pattern is created. Because there are four input points corresponding to the setting 1 through the setting 4 in the logic drawing LG3, totally 16 input patterns are sequentially created and the processing in the process after the step S610 is performed until the ending condition in the flowchart of FIG. 21 is satisfied. For example, a pattern "setting 1=0, setting 2=0, setting 3=0, setting 4=0" is created. In the step S610, logic simulation is performed by use of this pattern, and the value ("0", in this example) of the signal line 37 is acquired. Because, instead of the limiting condition "the signal line 37 becomes "1", "0" is acquired, the result of the determination in the step S611 becomes "NO", and because the input pattern with the limiting condition "the signal line 37 becomes "1" has not been tried yet, the result of the determination in the step S612 becomes "NO"; then, in the step S609, a pattern is created again. Because of the foregoing processing, as one example, in the logic simulation with "setting 1=0, setting 2=0, setting 3=0, setting 4=1", the value of the signal line 37 becomes "1"; therefore, this input pattern is set as the input condition, and then the processing is ended.

In the case where, even when all input patterns are created, the limiting condition is not satisfied, i.e., in the case where, in the example represented in FIG. 20, the signal line 37 does not become "1" with each of the combinations (16 combinations) of "1" and "0" for settings 1 through 4, it is conceivable that some sort of defect exists; therefore, in the step S612, the defect is detected, and in the step S614, the fact is notified.

Because there has been completed the step S323 where the operation of the signal line tracking unit 4 and the arithmetic element detection unit 5 in the test table creation system is performed, the step S323 is followed by the step S324; then, the process after the S324 is performed in the same manner as in Embodiment 2. The table creation unit 9 performs its operation represented in the flowchart of FIG. 16 in Embodiment 2, and eventually creates the test table TTB3 in which input conditions are described. FIG. 22 represents the test table TTB3 that is created in the present embodiment. FIG. 22 is an example of test table created by the table creation unit 9 according to Embodiment 3. The test table storage device 10 stores the test table TTB3 created by the table creation unit 9. The test table TTB3 according to Embodiment 3 is obtained by expanding the settings 1 to 2 in the test table TTB2 according to Embodiment 2 to the settings 1 to 4 corresponding to the logic drawing LG3.

The testing of the contents of the processing in the logic drawing LG3 can sufficiently be performed if the signal line 37 is set to either "0" or "1"; thus, in the test table TTB3, there are described only two out of the combinations of settings 1 to 4 with which the signal line 37 becomes either "0" or "1".

Even in the case of a module described with a complicated logic drawing where a great number of input points for the setting conditions exist, the test table creation system according to Embodiment 3 makes it possible to acquire the input point and the setting value thereof that are conditions for a test, by performing logic simulation. Accordingly, even in the case of a module with a further complicated logic drawing, manual creation and management of a test table are not required, whereby manual work related to testing is further reduced.

Various modifications and alterations of this invention will be apparent to those skilled in the art without departing from the scope and spirit of this invention, and it should be understood that this is not limited to the illustrative embodiments set forth herein.

What is claimed is:

1. A test table creation system, which creates a test table that includes input values, which are analogue values, and the expected values of the output of processing, in the case where there is performed a test of the processing described with a logic drawing configured with arithmetic elements for performing arithmetic operations and signal lines for connecting the arithmetic elements, the test table creation system comprising:

a logic drawing analysis unit that analyzes the logic drawing stored in a logic drawing storage device;

an input value creation unit that creates the input value for each of input value types into which the analogue values are categorized, based on an input point of the logic drawing derived by the logic drawing analysis unit and the input specification for the logic drawing stored in an input specification storage device;

an output value creation unit that creates the respective expected values corresponding to the input values created in the input value creation unit, for the output points that correspond to the types of arithmetic elements derived by the logic drawing analysis unit; and a table creation unit that creates a test table, based on the input value created by the input value creation unit and the expected value created by the output value creation unit.

2. The test table creation system according to claim 1, wherein the logic drawing includes a characteristic arithmetic element that receives the analogue value and outputs a discrete value and that has a threshold value with which the analogue value is compared so that the discrete value is determined; and the output value creation unit creates an expected value, by making the type, of an output point, which is derived by the logic drawing analysis unit based on the threshold value of the characteristic arithmetic element and the output point situated at the downstream of the characteristic arithmetic element, correspond to the output point.

3. The test table creation system according to any one of claims 1 and 2, wherein the logic drawing analysis unit has a signal line tracking unit that tracks a signal line originating from the input point in the logic drawing and an arithmetic element detection unit that detects an arithmetic element connected with the signal line that is tracked by the signal line tracking unit.

4. The test table creation system according to any one of claims 1 and 2, wherein the logic drawing analysis unit has an input point comparison unit that compares an input point in the logic drawing with an input point described in the input specification, and detects an input point in the logic drawing corresponding to the input point described in the input specification.

5. The test table creation system according to any one of claims 1 and 2, wherein, in the case where the arithmetic element detected during tracking of the signal line has two or more inputs, the logic drawing analysis unit follows a signal line in a direction opposite to the signal direction thereof from another input other than the input connected with the arithmetic element by the signal line that is being tracked, detects an input point connected with said another input, and creates input-condition information including the value of the input point determined based on a predetermined limiting condition; and the table creation unit creates a test table, based on the input-condition information, the input value created by the input value creation unit, and the expected value created by the output value creation unit.

6. The test table creation system according to claim 5, wherein, with regard to the arithmetic element detected in the process of following the signal line in the opposite direction, the logic drawing analysis unit acquires the set of all input points that directly or indirectly become inputs of the arithmetic element, performs logic simulation by substituting combinable values for the set of input points, and creates input-condition information including the value of the input point that satisfies the limiting condition.

7. The test table creation system according to claim 5, wherein, as the limiting condition, the value of said another input is selected in such a way that the value of the signal line being tracked with respect to the arithmetic element having two or more inputs becomes equal to the value of the output of said arithmetic element having two or more inputs.

8. The test table creation system according to claim 6, wherein, as the limiting condition, the value of said another input is selected in such a way that the value of the signal line being tracked with respect to the arithmetic element having two or more inputs becomes equal to the value of the output of said arithmetic element having two or more inputs.

9. The test table creation system according to claim 3, wherein the logic drawing analysis unit has an input point comparison unit that compares an input point in the logic drawing with an input point described in the input specification, and detects an input point in the logic drawing corresponding to the input point described in the input specification.

10. A computer implemented test table creation method of creating a test table that includes input values, which are analogue values, and the expected values of the output of processing, in the case where there is performed a test of the processing described with a logic drawing configured with arithmetic elements for performing arithmetic operations and signal lines for connecting the arithmetic elements, the test table creation method comprising:

an input value creation step of creating the input value for each of input value types into which the analogue values are categorized, based on an input point of the logic drawing derived by analyzing the logic drawing and the input specification for the logic drawing;

an output value creation step of creating the respective expected values corresponding to the input values created in the input value creation step, for the output points that correspond to the types of arithmetic elements derived by analyzing the logic drawing; and a table creation step of creating a test table, based on the input value created in the input value creation step and the expected value created in the output value creation step.

* * * * *

UNITED STATES PATENT AND TRADEMARK OFFICE
CERTIFICATE OF CORRECTION

| | | |
|---|---|---|
| PATENT NO. | : 8,401,813 B2 | Page 1 of 1 |
| APPLICATION NO. | : 12/796742 | |
| DATED | : March 19, 2013 | |
| INVENTOR(S) | : Shinichiro Tsudaka | |

It is certified that error appears in the above-identified patent and that said Letters Patent is hereby corrected as shown below:

On the title page, Item (73), the Assignee should read:

--(73) Assignee: Mitsubishi Electric Corporation, Tokyo (JP)--

Signed and Sealed this
Twenty-eighth Day of May, 2013

Teresa Stanek Rea
*Acting Director of the United States Patent and Trademark Office*